(12) United States Patent
Mokashi et al.

(10) Patent No.: US 10,592,578 B1
(45) Date of Patent: Mar. 17, 2020

(54) PREDICTIVE CONTENT PUSH-ENABLED CONTENT DELIVERY NETWORK

(71) Applicant: Amazon Technologies, Inc., Seattle, WA (US)

(72) Inventors: Ronil Sudhir Mokashi, Mercer Island, WA (US); Prashant Verma, Seattle, WA (US); Ryan Farris, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 15/914,823

(22) Filed: Mar. 7, 2018

(51) Int. Cl.
| | | |
|---|---|---|
| *G06F 16/957* | (2019.01) | |
| *H04L 29/08* | (2006.01) | |
| *G06K 9/62* | (2006.01) | |
| *H04L 12/911* | (2013.01) | |

(52) U.S. Cl.
CPC ....... *G06F 16/9574* (2019.01); *G06K 9/6297* (2013.01); *H04L 47/823* (2013.01); *H04L 67/1002* (2013.01); *H04L 67/26* (2013.01); *H04L 67/2842* (2013.01)

(58) Field of Classification Search
CPC .............. H04L 47/823; H04L 67/2842; G06F 16/9574
See application file for complete search history.

(56) References Cited

U.S. PATENT DOCUMENTS

| | | |
|---|---|---|
| 5,063,500 A | 11/1991 | Shorter |
| 5,341,477 A | 8/1994 | Pitkin et al. |
| 5,459,837 A | 10/1995 | Caccavale |
| 5,611,049 A | 3/1997 | Pitts |
| 5,627,889 A | 3/1997 | Eslambolchi |
| 5,701,467 A | 12/1997 | Freeston |

(Continued)

FOREIGN PATENT DOCUMENTS

| | | |
|---|---|---|
| CA | 2741 895 A1 | 5/2010 |
| CA | 2765397 A1 | 2/2011 |

(Continued)

OTHER PUBLICATIONS

B. T. H. Kumar, L. Vibha and K. R. Venugopal, "Web page access prediction using hierarchical clustering based on modified levenshtein distance and higher order Markov model," 2016 IEEE Region 10 Symposium (TENSYMP), Bali, 2016, pp. 1-6. (Year: 2016).*

(Continued)

*Primary Examiner* — John M Macilwinen
(74) *Attorney, Agent, or Firm* — Knobbe Martens Olson & Bear LLP

(57) ABSTRACT

A content delivery network ("CDN") is provided herein that predicts content resources (e.g., a data object, such as a video file, an audio file, a script, an image, a document, etc.) that may be requested by a user device in the future and transmits or pushes such resources to the user device prior to receiving a request. The CDN may use artificial intelligence models, such as Markov models, in order to predict which content resources to retrieve and transmit proactively to the user device. The predictive techniques implemented by the CDN may reduce a latency of delivering requested content resources and/or a latency of the user device in rendering and displaying a content page.

20 Claims, 8 Drawing Sheets

(56) References Cited

U.S. PATENT DOCUMENTS

| | | |
|---|---|---|
| 5,764,910 A | 6/1998 | Shachar |
| 5,774,660 A | 6/1998 | Brendel et al. |
| 5,852,717 A | 12/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,905,248 A | 5/1999 | Russell et al. |
| 5,933,811 A | 8/1999 | Angles et al. |
| 5,937,427 A | 8/1999 | Shinagawa et al. |
| 5,974,454 A | 10/1999 | Apfel et al. |
| 5,991,306 A | 11/1999 | Burns et al. |
| 5,999,274 A | 12/1999 | Lee et al. |
| 6,006,264 A | 12/1999 | Colby et al. |
| 6,016,512 A | 1/2000 | Huitema |
| 6,018,619 A | 1/2000 | Allard et al. |
| 6,026,452 A | 2/2000 | Pitts |
| 6,038,601 A | 3/2000 | Lambert et al. |
| 6,052,718 A | 4/2000 | Gifford |
| 6,078,960 A | 6/2000 | Ballard |
| 6,085,234 A | 7/2000 | Pitts et al. |
| 6,092,100 A | 7/2000 | Berstis et al. |
| 6,098,096 A | 8/2000 | Tsirigotis et al. |
| 6,108,703 A | 8/2000 | Leighton et al. |
| 6,128,279 A | 10/2000 | O'Neil et al. |
| 6,151,631 A | 11/2000 | Ansell et al. |
| 6,157,942 A | 12/2000 | Chu et al. |
| 6,167,438 A | 12/2000 | Yates et al. |
| 6,167,446 A | 12/2000 | Lister et al. |
| 6,173,316 B1 | 1/2001 | De Boor et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,243,761 B1 | 6/2001 | Mogul et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,324,580 B1 | 11/2001 | Jindal et al. |
| 6,330,602 B1 | 12/2001 | Law et al. |
| 6,338,082 B1 | 1/2002 | Schneider |
| 6,345,308 B1 | 2/2002 | Abe |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Millins |
| 6,389,532 B1 | 5/2002 | Gupta et al. |
| 6,405,252 B1 | 6/2002 | Gupta et al. |
| 6,408,360 B1 | 6/2002 | Chamberlain et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,442,165 B1 | 8/2002 | Sitaraman et al. |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,484,161 B1 | 11/2002 | Chipalkatti et al. |
| 6,493,765 B1 | 12/2002 | Cunningham et al. |
| 6,505,241 B2 | 1/2003 | Pitts |
| 6,513,112 B1 | 1/2003 | Craig et al. |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,622,168 B1 | 9/2003 | Datta |
| 6,643,357 B2 | 11/2003 | Lumsden |
| 6,643,707 B1 | 11/2003 | Booth |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,687,846 B1 | 2/2004 | Adrangi et al. |
| 6,694,358 B1 | 2/2004 | Swildens et al. |
| 6,697,805 B1 | 2/2004 | Choquier et al. |
| 6,718,324 B2 | 4/2004 | Edlund et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,862,607 B1 | 3/2005 | Vermeulen |
| 6,868,439 B2 | 3/2005 | Basu et al. |
| 6,874,017 B1 | 3/2005 | Inoue et al. |
| 6,917,951 B2 | 7/2005 | Orbits et al. |
| 6,925,499 B1 | 8/2005 | Chen et al. |
| 6,928,467 B2 | 8/2005 | Peng et al. |
| 6,928,485 B1 | 8/2005 | Krishnamurthy et al. |
| 6,941,562 B2 | 9/2005 | Gao et al. |
| 6,950,848 B1 | 9/2005 | Yousefi'zadeh et al. |
| 6,961,783 B1 | 9/2005 | Cook et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,027,582 B2 | 4/2006 | Khello et al. |
| 7,031,445 B2 | 4/2006 | Lumsden |
| 7,032,010 B1 | 4/2006 | Swildens et al. |
| 7,058,633 B1 | 6/2006 | Gnagy et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai et al. |
| 7,133,905 B2 | 11/2006 | Dilley et al. |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,174,382 B2 | 2/2007 | Ramanathan et al. |
| 7,185,046 B2 | 2/2007 | Ferstl et al. |

(56) References Cited

U.S. PATENT DOCUMENTS

| | | | |
|---|---|---|---|
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,194,552 B1 | 3/2007 | Schneider |
| 7,200,667 B2 | 4/2007 | Teodosiu et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,249,196 B1 | 7/2007 | Peiffer et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,272,227 B1 | 9/2007 | Beran |
| 7,274,658 B2 | 9/2007 | Bornstein et al. |
| 7,284,056 B2 | 10/2007 | Ramig |
| 7,289,519 B1 | 10/2007 | Liskov |
| 7,293,093 B2 | 11/2007 | Leighton |
| 7,308,499 B2 | 12/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 3/2008 | Wilz, Sr. et al. |
| 7,339,937 B2 | 3/2008 | Mitra et al. |
| 7,340,505 B2 | 3/2008 | Lisiecki et al. |
| 7,343,397 B2 | 3/2008 | Kochanski |
| 7,350,075 B1 | 3/2008 | Eastham et al. |
| 7,362,703 B1 | 3/2008 | Taft et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,372,809 B2 | 5/2008 | Chen |
| 7,373,416 B2 | 5/2008 | Kagan et al. |
| 7,376,716 B2 | 5/2008 | Dilley et al. |
| 7,376,736 B2 | 5/2008 | Sundaram et al. |
| 7,380,078 B2 | 5/2008 | Ikegaya et al. |
| 7,389,354 B1 | 6/2008 | Sitaraman et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,409,712 B1 | 8/2008 | Brooks et al. |
| 7,430,610 B2 | 9/2008 | Pace et al. |
| 7,437,438 B2 * | 10/2008 | Mogul .............. G06F 16/9574 709/223 |
| 7,441,045 B2 | 10/2008 | Skene et al. |
| 7,441,261 B2 | 10/2008 | Slater et al. |
| 7,451,230 B2 | 10/2008 | Corrado et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,705 B1 | 3/2009 | Papagiannaki et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,593,935 B2 | 9/2009 | Sullivan |
| 7,594,189 B1 | 9/2009 | Walker et al. |
| 7,596,619 B2 | 9/2009 | Leighton et al. |
| 7,603,439 B2 | 10/2009 | Dilley et al. |
| 7,613,815 B1 | 10/2009 | Prakash et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,624,264 B2 | 11/2009 | Aura et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,684,394 B1 | 3/2010 | Cutbill et al. |
| 7,685,109 B1 | 3/2010 | Ransil et al. |
| 7,685,251 B2 | 3/2010 | Houlihan et al. |
| 7,693,813 B1 | 4/2010 | Cao et al. |
| 7,693,959 B2 | 4/2010 | Leighton et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,017 B2 | 7/2010 | Goyal et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,853,719 B1 | 12/2010 | Cao et al. |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,890,989 B1 | 2/2011 | Hofrichter et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,713 B1 | 4/2011 | Day et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |

(56) References Cited

U.S. PATENT DOCUMENTS

| | | |
|---|---|---|
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,155,126 B1 | 3/2012 | Mao et al. |
| 8,156,199 B1 | 4/2012 | Hoche-Mong et al. |
| 8,156,243 B2 | 4/2012 | Richardson et al. |
| 8,161,184 B2 | 4/2012 | Sekar et al. |
| 8,175,863 B1 | 5/2012 | Ostermeyer et al. |
| 8,190,682 B2 | 5/2012 | Paterson-Jones et al. |
| 8,195,605 B2 | 6/2012 | Chellappa et al. |
| 8,195,837 B2 | 6/2012 | McCarthy et al. |
| 8,209,695 B1 | 6/2012 | Pruyne et al. |
| 8,224,971 B1 | 7/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,260,914 B1 | 8/2012 | Ranjan |
| 8,261,062 B2 | 9/2012 | Aura et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,296,393 B2 | 10/2012 | Alexander et al. |
| 8,296,786 B2 | 10/2012 | Faust et al. |
| 8,301,600 B1 | 10/2012 | Helmick et al. |
| 8,301,645 B1 | 10/2012 | Crook |
| 8,321,568 B2 | 11/2012 | Sivasubramanian et al. |
| 8,321,588 B2 | 11/2012 | Richardson et al. |
| 8,356,074 B1 | 1/2013 | Ehrlich et al. |
| 8,380,831 B2 | 2/2013 | Barber |
| 8,380,851 B2 | 2/2013 | McCarthy et al. |
| 8,392,928 B1 | 3/2013 | Forys et al. |
| 8,396,908 B2 | 3/2013 | Moore et al. |
| 8,402,137 B2 | 3/2013 | Sivasuramanian et al. |
| 8,423,408 B1 | 4/2013 | Barnes et al. |
| 8,423,662 B1 | 4/2013 | Weihl et al. |
| 8,433,749 B2 | 4/2013 | Wee et al. |
| 8,443,167 B1 | 5/2013 | Fallone et al. |
| 8,447,831 B1 | 5/2013 | Sivasubramanian et al. |
| 8,447,876 B2 | 5/2013 | Verma et al. |
| 8,452,745 B2 | 5/2013 | Ramakrishna |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,876 B2 | 8/2013 | Goodman et al. |
| 8,521,880 B1 | 8/2013 | Richardson et al. |
| 8,521,885 B1 | 8/2013 | Richardson et al. |
| 8,521,908 B2 | 8/2013 | Holmes et al. |
| 8,526,405 B2 | 9/2013 | Curtis et al. |
| 8,527,639 B1 | 9/2013 | Liskov et al. |
| 8,527,645 B1 | 9/2013 | Proffit et al. |
| 8,527,658 B2 | 9/2013 | Holmes et al. |
| 8,549,646 B2 | 10/2013 | Stavrou et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,612,565 B2 | 12/2013 | Schneider |
| 8,615,549 B2 | 12/2013 | Knowles et al. |
| 8,619,780 B1 | 12/2013 | Brandwine |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,645,700 B2 | 2/2014 | Smith et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 4/2014 | Richardson et al. |
| 8,712,950 B2 | 4/2014 | Smith et al. |
| 8,732,309 B1 | 5/2014 | Richardson et al. |
| 8,745,177 B1 | 6/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,775,553 B2 | 6/2014 | Cansino et al. |
| 8,782,207 B2 | 7/2014 | Qiu et al. |
| 8,782,236 B1 | 7/2014 | Marshall et al. |
| 8,782,279 B2 | 7/2014 | Eggleston et al. |
| 8,812,727 B1 | 8/2014 | Sorenson, III et al. |
| 8,819,283 B2 | 8/2014 | Richardson et al. |
| 8,826,032 B1 | 9/2014 | Yahalom et al. |
| 8,904,009 B1 | 12/2014 | Marshall et al. |
| 8,914,514 B1 | 12/2014 | Jenkins et al. |
| 8,914,626 B1 | 12/2014 | Adogla et al. |
| 8,914,797 B2 | 12/2014 | Osogami et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,935,744 B2 | 1/2015 | Osterweil et al. |
| 8,938,526 B1 | 1/2015 | Richardson et al. |
| 8,949,161 B2 | 2/2015 | Borst et al. |
| 8,949,459 B1 | 2/2015 | Scholl |
| 8,966,318 B1 | 2/2015 | Shah |
| 8,972,580 B2 | 3/2015 | Fleischman et al. |
| 8,976,711 B2 | 3/2015 | Li et al. |
| 9,003,035 B1 | 4/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,075,777 B1 | 7/2015 | Pope et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,106,701 B2 | 8/2015 | Richardson et al. |
| 9,116,803 B1 | 8/2015 | Agrawal et al. |

(56) References Cited

U.S. PATENT DOCUMENTS

| | | |
|---|---|---|
| 9,118,680 B1 | 8/2015 | Dunlap et al. |
| 9,130,756 B2 | 9/2015 | Richardson et al. |
| 9,130,977 B2 | 9/2015 | Zisapel et al. |
| 9,137,210 B1 | 9/2015 | Joglekar et al. |
| 9,137,301 B1 | 9/2015 | Dunlap et al. |
| 9,137,302 B1 | 9/2015 | Makhijani et al. |
| 9,154,551 B1 | 10/2015 | Watson |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,458 B2 | 11/2015 | Richardson et al. |
| 9,195,996 B1 | 11/2015 | Walsh et al. |
| 9,208,097 B2 | 12/2015 | Richardson et al. |
| 9,210,235 B2 | 12/2015 | Sivasubramanian et al. |
| 9,219,686 B2 | 12/2015 | Hilt et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,276,812 B1 | 3/2016 | Nagargadde et al. |
| 9,294,391 B1 | 3/2016 | Mostert |
| 9,323,577 B2 | 4/2016 | Marr et al. |
| 9,332,078 B2 | 5/2016 | Sivasubramanian et al. |
| 9,386,038 B2 | 7/2016 | Martini |
| 9,391,949 B1 | 7/2016 | Richardson et al. |
| 9,407,676 B2 | 8/2016 | Archer et al. |
| 9,407,681 B1 | 8/2016 | Richardson et al. |
| 9,407,699 B2 | 8/2016 | Sivasubramanian et al. |
| 9,444,718 B2 | 9/2016 | Khakpour et al. |
| 9,444,759 B2 | 9/2016 | Richardson et al. |
| 9,479,476 B2 | 10/2016 | Richardson et al. |
| 9,495,338 B1 | 11/2016 | Hollis et al. |
| 9,497,259 B1 | 11/2016 | Richardson et al. |
| 9,515,949 B2 | 12/2016 | Richardson et al. |
| 9,525,659 B1 | 12/2016 | Sonkin et al. |
| 9,544,394 B2 | 1/2017 | Richardson et al. |
| 9,571,389 B2 | 2/2017 | Richardson et al. |
| 9,584,328 B1 | 2/2017 | Graham-cumming |
| 9,590,946 B2 | 3/2017 | Richardson et al. |
| 9,608,957 B2 | 3/2017 | Sivasubramanian et al. |
| 9,621,660 B2 | 4/2017 | Sivasubramanian et al. |
| 9,628,509 B2 | 4/2017 | Holloway et al. |
| 9,628,554 B2 | 4/2017 | Marshall et al. |
| 9,645,808 B1 | 5/2017 | Turpie |
| 9,703,713 B2 | 7/2017 | Nadgowda |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 8/2017 | Richardson et al. |
| 9,742,795 B1 | 8/2017 | Radlein et al. |
| 9,760,420 B1 | 9/2017 | Letz et al. |
| 9,774,619 B1 | 9/2017 | Radlein et al. |
| 9,787,599 B2 | 10/2017 | Richardson et al. |
| 9,787,775 B1 | 10/2017 | Richardson et al. |
| 9,794,216 B2 | 10/2017 | Richardson et al. |
| 9,794,281 B1 | 10/2017 | Radlein et al. |
| 9,800,539 B2 | 10/2017 | Richardson et al. |
| 9,811,451 B1 | 11/2017 | Arguelles et al. |
| 9,819,567 B1 | 11/2017 | Uppal et al. |
| 9,832,141 B1 | 11/2017 | Raftery |
| 9,871,794 B2 | 1/2018 | Joffe et al. |
| 9,887,914 B2 | 2/2018 | Bergman |
| 9,887,915 B2 | 2/2018 | Richardson et al. |
| 9,887,931 B2 | 2/2018 | Uppal et al. |
| 9,887,932 B1 | 2/2018 | Uppal et al. |
| 9,888,089 B2 | 2/2018 | Sivasubramanian et al. |
| 9,893,957 B2 | 2/2018 | Ellsworth et al. |
| 9,894,168 B2 | 2/2018 | Sivasubramanian et al. |
| 9,900,402 B1 | 2/2018 | Li et al. |
| 9,912,740 B2 | 3/2018 | Richardson et al. |
| 9,929,959 B2 | 3/2018 | Mostert |
| 9,930,131 B2 | 3/2018 | MacCarthaigh et al. |
| 9,954,934 B2 | 4/2018 | Sivasubramanian et al. |
| 9,985,927 B2 | 5/2018 | Richardson et al. |
| 9,992,086 B1 | 6/2018 | Mizik et al. |
| 9,992,303 B2 | 6/2018 | Richardson et al. |
| 10,015,237 B2 | 7/2018 | Richardson et al. |
| 10,015,241 B2 | 7/2018 | Marr et al. |
| 10,021,179 B1 | 7/2018 | Velummylum et al. |
| 10,027,582 B2 | 7/2018 | Richardson et al. |
| 10,033,627 B1 | 7/2018 | Howard et al. |
| 10,033,691 B2 | 7/2018 | Mizik et al. |
| 10,033,699 B2 | 7/2018 | Sullivan et al. |
| 10,049,051 B1 | 8/2018 | Baldwin |
| 10,075,551 B1 | 9/2018 | Baldwin et al. |
| 10,079,742 B1 | 9/2018 | Richardson et al. |
| 10,091,096 B1 | 10/2018 | Howard et al. |
| 10,097,398 B1 | 10/2018 | Richardson et al. |
| 10,097,448 B1 | 10/2018 | Howard et al. |
| 10,097,566 B1 | 10/2018 | Radlein et al. |
| 10,110,694 B1 | 10/2018 | Watson et al. |
| 10,116,584 B2 | 10/2018 | Richardson et al. |
| 10,135,620 B2 | 11/2018 | Richardson et al. |
| 10,157,135 B2 | 12/2018 | Richardson et al. |
| 10,158,729 B2 | 12/2018 | Sivasubramanian et al. |
| 10,162,753 B2 | 12/2018 | Marshall et al. |
| 10,180,993 B2 | 1/2019 | Raftery |
| 10,200,402 B2 | 2/2019 | Radlein et al. |
| 10,200,492 B2 | 2/2019 | MacCarthaigh et al. |
| 10,205,698 B1 | 2/2019 | Petersen et al. |
| 10,218,584 B2 | 2/2019 | Ellsworth et al. |
| 10,225,322 B2 | 3/2019 | Richardson et al. |
| 10,225,326 B1 | 3/2019 | Puchala et al. |
| 10,225,362 B2 | 3/2019 | Watson |
| 10,230,819 B2 | 3/2019 | Richardson et al. |
| 10,257,307 B1 | 3/2019 | Baldwin |
| 10,264,062 B2 | 4/2019 | Richardson et al. |
| 10,270,878 B1 | 4/2019 | Uppal et al. |
| 10,305,797 B2 | 5/2019 | Richardson et al. |
| 10,348,639 B2 | 7/2019 | Puchala et al. |
| 10,374,955 B2 | 8/2019 | Mostert |
| 10,447,648 B2 | 10/2019 | Bliss et al. |
| 2001/0000811 A1 | 5/2001 | May et al. |
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004816 A1 | 1/2002 | Vange et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0035624 A1 | 3/2002 | Kim |
| 2002/0048269 A1 | 4/2002 | Hong et al. |
| 2002/0049608 A1 | 4/2002 | Hartsell et al. |
| 2002/0049842 A1 | 4/2002 | Huetsch et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0065910 A1 | 5/2002 | Dutta |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |

(56) References Cited

U.S. PATENT DOCUMENTS

| | | | |
|---|---|---|---|
| 2002/0103778 A1* | 8/2002 | Saxena | G06F 16/9574 |
| 2002/0103820 A1 | 8/2002 | Cartmell et al. | |
| 2002/0103972 A1 | 8/2002 | Satran et al. | |
| 2002/0107944 A1 | 8/2002 | Bai et al. | |
| 2002/0112049 A1 | 8/2002 | Elnozahy et al. | |
| 2002/0112123 A1 | 8/2002 | Becker et al. | |
| 2002/0116481 A1 | 8/2002 | Lee | |
| 2002/0116491 A1 | 8/2002 | Boyd et al. | |
| 2002/0116582 A1 | 8/2002 | Copeland et al. | |
| 2002/0120666 A1 | 8/2002 | Landsman et al. | |
| 2002/0120782 A1 | 8/2002 | Dillon et al. | |
| 2002/0124047 A1 | 9/2002 | Gartner et al. | |
| 2002/0124098 A1 | 9/2002 | Shaw | |
| 2002/0129123 A1 | 9/2002 | Johnson et al. | |
| 2002/0131428 A1 | 9/2002 | Pecus et al. | |
| 2002/0133741 A1 | 9/2002 | Maeda et al. | |
| 2002/0135611 A1 | 9/2002 | Deosaran et al. | |
| 2002/0138286 A1 | 9/2002 | Engstrom | |
| 2002/0138437 A1 | 9/2002 | Lewin et al. | |
| 2002/0138443 A1 | 9/2002 | Schran et al. | |
| 2002/0138649 A1 | 9/2002 | Cartmell et al. | |
| 2002/0143675 A1 | 10/2002 | Orshan | |
| 2002/0143798 A1 | 10/2002 | Lisiecki et al. | |
| 2002/0143989 A1 | 10/2002 | Huitema et al. | |
| 2002/0145993 A1 | 10/2002 | Chowdhury et al. | |
| 2002/0147770 A1 | 10/2002 | Tang | |
| 2002/0147774 A1 | 10/2002 | Lisiecki et al. | |
| 2002/0150094 A1 | 10/2002 | Cheng et al. | |
| 2002/0150276 A1 | 10/2002 | Chang | |
| 2002/0152326 A1 | 10/2002 | Orshan | |
| 2002/0154157 A1 | 10/2002 | Sherr et al. | |
| 2002/0156884 A1 | 10/2002 | Bertram et al. | |
| 2002/0156911 A1 | 10/2002 | Croman et al. | |
| 2002/0161745 A1 | 10/2002 | Call | |
| 2002/0161767 A1 | 10/2002 | Shapiro et al. | |
| 2002/0163882 A1 | 11/2002 | Bornstein et al. | |
| 2002/0165912 A1 | 11/2002 | Wenocur et al. | |
| 2002/0169890 A1 | 11/2002 | Beaumont et al. | |
| 2002/0184368 A1 | 12/2002 | Wang | |
| 2002/0188722 A1 | 12/2002 | Banerjee et al. | |
| 2002/0194324 A1 | 12/2002 | Guha | |
| 2002/0194382 A1 | 12/2002 | Kausik et al. | |
| 2002/0198953 A1 | 12/2002 | O'Rourke et al. | |
| 2003/0002484 A1 | 1/2003 | Freedman | |
| 2003/0004998 A1 | 1/2003 | Datta | |
| 2003/0005036 A1 | 1/2003 | Mitzenmacher | |
| 2003/0005111 A1 | 1/2003 | Allan | |
| 2003/0007482 A1 | 1/2003 | Khello et al. | |
| 2003/0009488 A1 | 1/2003 | Hart, III | |
| 2003/0009591 A1 | 1/2003 | Hayball et al. | |
| 2003/0026410 A1 | 2/2003 | Lumsden | |
| 2003/0028642 A1 | 2/2003 | Agarwal et al. | |
| 2003/0033283 A1 | 2/2003 | Evans et al. | |
| 2003/0037108 A1 | 2/2003 | Peiffer et al. | |
| 2003/0037139 A1 | 2/2003 | Shteyn | |
| 2003/0037284 A1 | 2/2003 | Srinivasan et al. | |
| 2003/0041094 A1 | 2/2003 | Lara et al. | |
| 2003/0046343 A1 | 3/2003 | Krishnamurthy et al. | |
| 2003/0065739 A1 | 4/2003 | Shnier | |
| 2003/0070096 A1 | 4/2003 | Pazi et al. | |
| 2003/0074401 A1 | 4/2003 | Connell et al. | |
| 2003/0074471 A1 | 4/2003 | Anderson et al. | |
| 2003/0074472 A1 | 4/2003 | Lucco et al. | |
| 2003/0079027 A1 | 4/2003 | Slocombe et al. | |
| 2003/0093523 A1 | 5/2003 | Cranor et al. | |
| 2003/0099202 A1 | 5/2003 | Lear et al. | |
| 2003/0099237 A1 | 5/2003 | Mitra et al. | |
| 2003/0101278 A1 | 5/2003 | Garcia-Luna-Aceves et al. | |
| 2003/0105829 A1 | 6/2003 | Hayward | |
| 2003/0105857 A1 | 6/2003 | Kamen et al. | |
| 2003/0112792 A1 | 6/2003 | Cranor et al. | |
| 2003/0120741 A1 | 6/2003 | Wu et al. | |
| 2003/0126387 A1 | 7/2003 | Watanabe | |
| 2003/0133554 A1 | 7/2003 | Nykanen et al. | |
| 2003/0135467 A1 | 7/2003 | Okamoto | |
| 2003/0135509 A1 | 7/2003 | Davis et al. | |
| 2003/0140087 A1 | 7/2003 | Lincoln et al. | |
| 2003/0145038 A1 | 7/2003 | Bin Tariq et al. | |
| 2003/0145066 A1 | 7/2003 | Okada et al. | |
| 2003/0149581 A1 | 8/2003 | Chaudhri et al. | |
| 2003/0154239 A1 | 8/2003 | Davis et al. | |
| 2003/0154284 A1 | 8/2003 | Bernardin et al. | |
| 2003/0163722 A1 | 8/2003 | Anderson, IV | |
| 2003/0172145 A1 | 9/2003 | Nguyen | |
| 2003/0172183 A1 | 9/2003 | Anderson, IV et al. | |
| 2003/0172291 A1 | 9/2003 | Judge et al. | |
| 2003/0174648 A1 | 9/2003 | Wang et al. | |
| 2003/0177321 A1 | 9/2003 | Watanabe | |
| 2003/0182305 A1 | 9/2003 | Balva et al. | |
| 2003/0182413 A1 | 9/2003 | Allen et al. | |
| 2003/0182447 A1 | 9/2003 | Schilling | |
| 2003/0187935 A1 | 10/2003 | Agarwalla et al. | |
| 2003/0187970 A1 | 10/2003 | Chase et al. | |
| 2003/0191822 A1 | 10/2003 | Leighton et al. | |
| 2003/0200394 A1 | 10/2003 | Ashmore et al. | |
| 2003/0204602 A1 | 10/2003 | Hudson et al. | |
| 2003/0206520 A1 | 11/2003 | Wu et al. | |
| 2003/0221000 A1 | 11/2003 | Cherkasova et al. | |
| 2003/0229682 A1 | 12/2003 | Day | |
| 2003/0233423 A1 | 12/2003 | Dilley et al. | |
| 2003/0233445 A1 | 12/2003 | Levy et al. | |
| 2003/0233455 A1 | 12/2003 | Leber et al. | |
| 2003/0236700 A1 | 12/2003 | Arning et al. | |
| 2003/0236779 A1 | 12/2003 | Choi et al. | |
| 2004/0003032 A1 | 1/2004 | Ma et al. | |
| 2004/0010562 A1 | 1/2004 | Itonaga | |
| 2004/0010563 A1 | 1/2004 | Forte et al. | |
| 2004/0010588 A1 | 1/2004 | Slater et al. | |
| 2004/0010601 A1 | 1/2004 | Afergan | |
| 2004/0010621 A1 | 1/2004 | Afergan et al. | |
| 2004/0010683 A1 | 1/2004 | Huitema | |
| 2004/0015584 A1 | 1/2004 | Cartmell et al. | |
| 2004/0019518 A1 | 1/2004 | Abraham et al. | |
| 2004/0024841 A1 | 2/2004 | Becker et al. | |
| 2004/0030620 A1 | 2/2004 | Benjamin et al. | |
| 2004/0032278 A1 | 2/2004 | Orii et al. | |
| 2004/0034744 A1 | 2/2004 | Karlsson et al. | |
| 2004/0039798 A1 | 2/2004 | Hotz et al. | |
| 2004/0044731 A1 | 3/2004 | Chen et al. | |
| 2004/0044791 A1 | 3/2004 | Pouzzner | |
| 2004/0054757 A1 | 3/2004 | Ueda et al. | |
| 2004/0059805 A1 | 3/2004 | Dinker et al. | |
| 2004/0064335 A1 | 4/2004 | Yang | |
| 2004/0064501 A1 | 4/2004 | Jan et al. | |
| 2004/0068542 A1 | 4/2004 | Lalonde et al. | |
| 2004/0073596 A1 | 4/2004 | Kloninger et al. | |
| 2004/0073707 A1 | 4/2004 | Dillon | |
| 2004/0073867 A1 | 4/2004 | Kausik et al. | |
| 2004/0078468 A1 | 4/2004 | Hedin et al. | |
| 2004/0078487 A1 | 4/2004 | Cernohous et al. | |
| 2004/0083283 A1 | 4/2004 | Sundaram et al. | |
| 2004/0083307 A1 | 4/2004 | Uysal | |
| 2004/0098478 A1 | 5/2004 | Koetke et al. | |
| 2004/0105544 A1 | 6/2004 | Haneda et al. | |
| 2004/0114579 A1 | 6/2004 | Karaoguz et al. | |
| 2004/0117309 A1 | 6/2004 | Inoue et al. | |
| 2004/0117455 A1 | 6/2004 | Kaminksy et al. | |
| 2004/0128344 A1 | 7/2004 | Trossen | |
| 2004/0128346 A1 | 7/2004 | Melamed et al. | |
| 2004/0148520 A1 | 7/2004 | Talpade et al. | |
| 2004/0167981 A1 | 8/2004 | Douglas et al. | |
| 2004/0167982 A1 | 8/2004 | Cohen et al. | |
| 2004/0170379 A1 | 9/2004 | Yao et al. | |
| 2004/0172466 A1 | 9/2004 | Douglas et al. | |
| 2004/0184456 A1 | 9/2004 | Binding et al. | |
| 2004/0194085 A1 | 9/2004 | Beaubien et al. | |
| 2004/0194102 A1 | 9/2004 | Neerdaels | |
| 2004/0203630 A1 | 10/2004 | Wang | |
| 2004/0205149 A1 | 10/2004 | Dillon et al. | |
| 2004/0205162 A1 | 10/2004 | Parikh | |
| 2004/0215823 A1 | 10/2004 | Kleinfelter et al. | |
| 2004/0221019 A1 | 11/2004 | Swildens et al. | |
| 2004/0221034 A1 | 11/2004 | Kausik et al. | |
| 2004/0246948 A1 | 12/2004 | Lee et al. | |

(56) References Cited

U.S. PATENT DOCUMENTS

| | | |
|---|---|---|
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0015471 A1 | 1/2005 | Zhang et al. |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0039019 A1 | 2/2005 | Delany |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0147088 A1 | 7/2005 | Bao et al. |
| 2005/0149529 A1 | 7/2005 | Gutmans |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0172080 A1 | 8/2005 | Miyauchi |
| 2005/0174989 A1 | 8/2005 | Chen et al. |
| 2005/0181769 A1 | 8/2005 | Kogawa |
| 2005/0188073 A1 | 8/2005 | Nakamichi et al. |
| 2005/0192008 A1 | 9/2005 | Desai et al. |
| 2005/0192814 A1 | 9/2005 | Challener et al. |
| 2005/0198170 A1 | 9/2005 | LeMay et al. |
| 2005/0198200 A1 | 9/2005 | Subramanian et al. |
| 2005/0198303 A1 | 9/2005 | Knauerhase et al. |
| 2005/0198334 A1 | 9/2005 | Farber et al. |
| 2005/0198453 A1 | 9/2005 | Osaki |
| 2005/0198571 A1 | 9/2005 | Kramer et al. |
| 2005/0201302 A1 | 9/2005 | Gaddis et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 11/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 12/2005 | Agrawal et al. |
| 2005/0267928 A1 | 12/2005 | Anderson et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2005/0286564 A1 | 12/2005 | Hatley et al. |
| 2006/0005014 A1 | 1/2006 | Aura et al. |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0021001 A1 | 1/2006 | Giles et al. |
| 2006/0026067 A1 | 2/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0045005 A1 | 3/2006 | Blackmore et al. |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0070060 A1 | 3/2006 | Tantawi et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0106938 A1 | 5/2006 | Dini et al. |
| 2006/0107036 A1 | 5/2006 | Randle et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0129766 A1 | 6/2006 | Cassia et al. |
| 2006/0136453 A1 | 6/2006 | Kwan |
| 2006/0143293 A1 | 6/2006 | Freedman |
| 2006/0143442 A1 | 6/2006 | Smith |
| 2006/0146820 A1 | 7/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0188097 A1 | 8/2006 | Taniguchi et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0221971 A1 | 9/2006 | Andrieux et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0242227 A1 | 10/2006 | Rao |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2006/0288424 A1 | 12/2006 | Saito |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |

(56) References Cited

U.S. PATENT DOCUMENTS

| | | |
|---|---|---|
| 2007/0038994 A1 | 2/2007 | Davis et al. |
| 2007/0041393 A1 | 2/2007 | Westhead et al. |
| 2007/0043667 A1 | 2/2007 | Qawami et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0055765 A1 | 3/2007 | Lisiecki et al. |
| 2007/0061440 A1 | 3/2007 | Sundaram et al. |
| 2007/0064610 A1 | 3/2007 | Khandani |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156726 A1 | 7/2007 | Levy |
| 2007/0156919 A1 | 7/2007 | Potti et al. |
| 2007/0162331 A1 | 7/2007 | Sullivan |
| 2007/0168336 A1 | 7/2007 | Ransil et al. |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0233896 A1 | 10/2007 | Hilt et al. |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250468 A1 | 10/2007 | Pieper |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280197 A1 | 11/2007 | Pearlman et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2007/0294419 A1 | 12/2007 | Ulevitch |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0049615 A1 | 2/2008 | Bugenhagen |
| 2008/0056207 A1 | 3/2008 | Eriksson et al. |
| 2008/0065724 A1 | 3/2008 | Seed et al. |
| 2008/0065745 A1 | 3/2008 | Leighton et al. |
| 2008/0066072 A1 | 3/2008 | Yurekli et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0101358 A1 | 5/2008 | Van Ewijk et al. |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0222647 A1 | 9/2008 | Taylor et al. |
| 2008/0228574 A1 | 9/2008 | Stewart et al. |
| 2008/0228920 A1 | 9/2008 | Souders et al. |
| 2008/0235383 A1 | 9/2008 | Schneider |
| 2008/0235400 A1 | 9/2008 | Slocombe et al. |
| 2008/0256087 A1 | 10/2008 | Piironen et al. |
| 2008/0256175 A1 | 10/2008 | Lee et al. |
| 2008/0263135 A1 | 10/2008 | Olliphant |
| 2008/0270882 A1 | 10/2008 | Rollins et al. |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0043900 A1 | 2/2009 | Barber |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0086728 A1 | 4/2009 | Gulati et al. |
| 2009/0086741 A1 | 4/2009 | Zhang |
| 2009/0089869 A1 | 4/2009 | Varghese |
| 2009/0094252 A1 | 4/2009 | Wong et al. |
| 2009/0103707 A1 | 4/2009 | McGary et al. |
| 2009/0106202 A1 | 4/2009 | Mizrahi |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |

(56) References Cited

U.S. PATENT DOCUMENTS

| | | |
|---|---|---|
| 2009/0132640 A1 | 5/2009 | Verma et al. |
| 2009/0132648 A1 | 5/2009 | Swildens et al. |
| 2009/0138533 A1 | 5/2009 | Iwasaki et al. |
| 2009/0138582 A1 | 5/2009 | Turk |
| 2009/0144411 A1 | 6/2009 | Winkler et al. |
| 2009/0144412 A1 | 6/2009 | Ferguson et al. |
| 2009/0150926 A1 | 6/2009 | Schlack |
| 2009/0157504 A1 | 6/2009 | Braemer et al. |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0228708 A1 | 9/2009 | Trostle |
| 2009/0233623 A1 | 9/2009 | Johnson |
| 2009/0241167 A1 | 9/2009 | Moore |
| 2009/0248697 A1 | 10/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 11/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0023621 A1 | 1/2010 | Ezolt et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0049862 A1 | 2/2010 | Dixon |
| 2010/0057894 A1 | 3/2010 | Glasser |
| 2010/0070603 A1 | 3/2010 | Moss et al. |
| 2010/0070700 A1 | 3/2010 | Borst et al. |
| 2010/0074268 A1 | 3/2010 | Raza |
| 2010/0082320 A1 | 4/2010 | Wood et al. |
| 2010/0082787 A1 | 4/2010 | Kommula et al. |
| 2010/0088367 A1 | 4/2010 | Brown et al. |
| 2010/0088369 A1* | 4/2010 | Sebastian ........... H04L 29/00 709/203 |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0103837 A1 | 4/2010 | Jungck et al. |
| 2010/0106934 A1 | 4/2010 | Calder et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161564 A1 | 6/2010 | Lee et al. |
| 2010/0161565 A1 | 6/2010 | Lee et al. |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0191854 A1 | 7/2010 | Isci et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0306382 A1 | 11/2010 | Cardosa et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2011/0010244 A1 | 1/2011 | Hatridge |
| 2011/0016214 A1 | 1/2011 | Jackson |
| 2011/0029598 A1 | 2/2011 | Arnold et al. |
| 2011/0035469 A1 | 2/2011 | Smith et al. |
| 2011/0040893 A1 | 2/2011 | Karaoguz et al. |
| 2011/0051738 A1 | 3/2011 | Xu |
| 2011/0055386 A1 | 3/2011 | Middleton et al. |
| 2011/0055714 A1 | 3/2011 | Vemulapalli et al. |
| 2011/0055921 A1 | 3/2011 | Narayanaswamy et al. |
| 2011/0057790 A1 | 3/2011 | Martin et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 4/2011 | Jana et al. |
| 2011/0087769 A1 | 4/2011 | Holmes et al. |
| 2011/0093584 A1 | 4/2011 | Qiu et al. |
| 2011/0096987 A1 | 4/2011 | Morales et al. |
| 2011/0106949 A1 | 5/2011 | Patel et al. |
| 2011/0113467 A1 | 5/2011 | Agarwal et al. |
| 2011/0125894 A1 | 5/2011 | Anderson et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0154350 A1 | 6/2011 | Doyle et al. |
| 2011/0161461 A1 | 6/2011 | Niven-Jenkins |
| 2011/0166935 A1 | 7/2011 | Armentrout et al. |
| 2011/0182290 A1 | 7/2011 | Perkins |
| 2011/0191445 A1 | 8/2011 | Dazzi |
| 2011/0191446 A1 | 8/2011 | Dazzi et al. |
| 2011/0191447 A1 | 8/2011 | Dazzi et al. |
| 2011/0191449 A1 | 8/2011 | Swildens et al. |
| 2011/0191459 A1 | 8/2011 | Joshi |
| 2011/0196892 A1 | 8/2011 | Xia |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |

(56) References Cited

U.S. PATENT DOCUMENTS

| | | |
|---|---|---|
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0255445 A1 | 10/2011 | Johnson et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0296370 A1 | 12/2011 | Ferris et al. |
| 2011/0296473 A1 | 12/2011 | Babic |
| 2011/0302304 A1 | 12/2011 | Baumback et al. |
| 2011/0307533 A1 | 12/2011 | Saeki |
| 2011/0320522 A1 | 12/2011 | Endres et al. |
| 2011/0320559 A1 | 12/2011 | Foti |
| 2012/0011190 A1 | 1/2012 | Driesen et al. |
| 2012/0014249 A1 | 1/2012 | Mao et al. |
| 2012/0023090 A1 | 1/2012 | Holloway et al. |
| 2012/0023226 A1 | 1/2012 | Petersen et al. |
| 2012/0036238 A1 | 2/2012 | Sundaram et al. |
| 2012/0041899 A1 | 2/2012 | Greene et al. |
| 2012/0041970 A1 | 2/2012 | Ghosh et al. |
| 2012/0054860 A1 | 2/2012 | Wyschogrod et al. |
| 2012/0066360 A1 | 3/2012 | Ghosh |
| 2012/0072600 A1 | 3/2012 | Richardson et al. |
| 2012/0072608 A1 | 3/2012 | Peters et al. |
| 2012/0078998 A1 | 3/2012 | Son et al. |
| 2012/0079096 A1 | 3/2012 | Cowan et al. |
| 2012/0079115 A1 | 3/2012 | Richardson et al. |
| 2012/0089700 A1 | 4/2012 | Safruti et al. |
| 2012/0089972 A1 | 4/2012 | Scheidel et al. |
| 2012/0096065 A1 | 4/2012 | Suit et al. |
| 2012/0096166 A1 | 4/2012 | Devarapalli et al. |
| 2012/0110515 A1 | 5/2012 | Abramoff et al. |
| 2012/0117621 A1 | 5/2012 | Kondamuru et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0142310 A1 | 6/2012 | Pugh et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173760 A1 | 7/2012 | Jog et al. |
| 2012/0179796 A1 | 7/2012 | Nagaraj et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0198071 A1 | 8/2012 | Black et al. |
| 2012/0209942 A1 | 8/2012 | Zehavi et al. |
| 2012/0224516 A1 | 9/2012 | Stojanovski et al. |
| 2012/0226649 A1 | 9/2012 | Kovacs et al. |
| 2012/0233329 A1 | 9/2012 | Dickinson et al. |
| 2012/0233522 A1 | 9/2012 | Barton et al. |
| 2012/0233668 A1 | 9/2012 | Leafe et al. |
| 2012/0239725 A1 | 9/2012 | Hartrick et al. |
| 2012/0246129 A1 | 9/2012 | Rothschild et al. |
| 2012/0246257 A1 | 9/2012 | Brown |
| 2012/0254961 A1 | 10/2012 | Kim et al. |
| 2012/0257628 A1 | 10/2012 | Bu et al. |
| 2012/0259954 A1 | 10/2012 | McCarthy et al. |
| 2012/0272224 A1 | 10/2012 | Brackman |
| 2012/0278229 A1 | 11/2012 | Vishwanathan et al. |
| 2012/0278831 A1 | 11/2012 | van Coppenolle et al. |
| 2012/0297009 A1 | 11/2012 | Amir et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0317573 A1 | 12/2012 | Osogami et al. |
| 2012/0324089 A1 | 12/2012 | Joshi |
| 2013/0003547 A1 | 1/2013 | Motwani et al. |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0018945 A1 | 1/2013 | Vendrow et al. |
| 2013/0019311 A1 | 1/2013 | Swildens et al. |
| 2013/0034099 A1 | 2/2013 | Hikichi et al. |
| 2013/0036307 A1 | 2/2013 | Gagliano et al. |
| 2013/0041872 A1 | 2/2013 | Aizman et al. |
| 2013/0046869 A1 | 2/2013 | Jenkins et al. |
| 2013/0046883 A1 | 2/2013 | Lientz et al. |
| 2013/0054675 A1 | 2/2013 | Jenkins et al. |
| 2013/0055374 A1 | 2/2013 | Kustarz et al. |
| 2013/0061306 A1 | 3/2013 | Sinn |
| 2013/0067530 A1 | 3/2013 | Spektor et al. |
| 2013/0073808 A1 | 3/2013 | Puthalath et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0080623 A1 | 3/2013 | Thireault |
| 2013/0080627 A1 | 3/2013 | Kukreja et al. |
| 2013/0080636 A1 | 3/2013 | Friedman et al. |
| 2013/0086001 A1 | 4/2013 | Bhogal et al. |
| 2013/0089005 A1 | 4/2013 | Li et al. |
| 2013/0111035 A1 | 5/2013 | Alapati et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0133057 A1 | 5/2013 | Yoon et al. |
| 2013/0151646 A1 | 6/2013 | Chidambaram et al. |
| 2013/0191499 A1 | 7/2013 | Ludin et al. |
| 2013/0198341 A1 | 8/2013 | Kim |
| 2013/0212300 A1 | 8/2013 | Eggleston et al. |
| 2013/0219020 A1 | 8/2013 | McCarthy et al. |
| 2013/0227165 A1 | 8/2013 | Liu |
| 2013/0246567 A1 | 9/2013 | Green et al. |
| 2013/0254269 A1 | 9/2013 | Sivasubramanian et al. |
| 2013/0254879 A1 | 9/2013 | Chesla et al. |
| 2013/0263256 A1 | 10/2013 | Dickinson et al. |
| 2013/0268616 A1 | 10/2013 | Sakata et al. |
| 2013/0275549 A1 | 10/2013 | Field et al. |
| 2013/0279335 A1 | 10/2013 | Ahmadi |
| 2013/0283266 A1 | 10/2013 | Baset et al. |
| 2013/0305046 A1 | 11/2013 | Mankovski et al. |
| 2013/0305083 A1 | 11/2013 | Machida |
| 2013/0311583 A1 | 11/2013 | Humphreys et al. |
| 2013/0311605 A1 | 11/2013 | Richardson et al. |
| 2013/0311989 A1 | 11/2013 | Ota et al. |
| 2013/0339429 A1 | 12/2013 | Richardson et al. |
| 2013/0346465 A1 | 12/2013 | Maltz et al. |
| 2013/0346470 A1 | 12/2013 | Obstfeld et al. |
| 2013/0346567 A1 | 12/2013 | Richardson et al. |
| 2013/0346614 A1 | 12/2013 | Baughman et al. |
| 2014/0006577 A1 | 1/2014 | Joe et al. |
| 2014/0007239 A1 | 1/2014 | Sharpe et al. |
| 2014/0013403 A1 | 1/2014 | Shuster |
| 2014/0019605 A1 | 1/2014 | Boberg |
| 2014/0022951 A1 | 1/2014 | Lemieux |
| 2014/0036675 A1 | 2/2014 | Wang et al. |
| 2014/0040478 A1 | 2/2014 | Hsu et al. |
| 2014/0047104 A1 | 2/2014 | Rodriguez |
| 2014/0053022 A1 | 2/2014 | Forgette et al. |
| 2014/0059198 A1 | 2/2014 | Richardson et al. |
| 2014/0059379 A1 | 2/2014 | Ren et al. |
| 2014/0082165 A1 | 3/2014 | Marr et al. |
| 2014/0082614 A1 | 3/2014 | Klein et al. |
| 2014/0089917 A1 | 3/2014 | Attalla et al. |
| 2014/0108474 A1 | 4/2014 | David et al. |
| 2014/0108672 A1 | 4/2014 | Ou et al. |
| 2014/0122698 A1 | 5/2014 | Batrouni et al. |
| 2014/0122725 A1 | 5/2014 | Batrouni et al. |
| 2014/0137111 A1 | 5/2014 | Dees et al. |
| 2014/0143305 A1 | 5/2014 | Choi et al. |
| 2014/0149601 A1 | 5/2014 | Carney et al. |
| 2014/0164817 A1 | 6/2014 | Bartholomy et al. |
| 2014/0165061 A1 | 6/2014 | Greene et al. |
| 2014/0195686 A1 | 7/2014 | Yeager et al. |

(56) References Cited

U.S. PATENT DOCUMENTS

| | | |
|---|---|---|
| 2014/0200036 A1 | 7/2014 | Egner et al. |
| 2014/0215019 A1 | 7/2014 | Ahrens |
| 2014/0244937 A1 | 8/2014 | Bloomstein et al. |
| 2014/0269371 A1 | 9/2014 | Badea et al. |
| 2014/0280606 A1 | 9/2014 | Long |
| 2014/0280679 A1 | 9/2014 | Dey et al. |
| 2014/0297866 A1 | 10/2014 | Ennaji et al. |
| 2014/0297870 A1 | 10/2014 | Eggleston et al. |
| 2014/0298021 A1 | 10/2014 | Kwon et al. |
| 2014/0310402 A1 | 10/2014 | Giaretta et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0351413 A1 | 11/2014 | Smith et al. |
| 2014/0351871 A1 | 11/2014 | Bomfim et al. |
| 2015/0006615 A1 | 1/2015 | Wainner et al. |
| 2015/0019686 A1 | 1/2015 | Backholm |
| 2015/0026407 A1 | 1/2015 | Mclellan et al. |
| 2015/0067171 A1 | 3/2015 | Yum |
| 2015/0074228 A1 | 3/2015 | Drake |
| 2015/0081877 A1 | 3/2015 | Sethi et al. |
| 2015/0088964 A1 | 3/2015 | Shiell et al. |
| 2015/0088972 A1 | 3/2015 | Brand et al. |
| 2015/0089621 A1 | 3/2015 | Khalid |
| 2015/0106864 A1 | 4/2015 | Li et al. |
| 2015/0154051 A1 | 6/2015 | Kruglick |
| 2015/0156279 A1 | 6/2015 | Vaswani et al. |
| 2015/0172379 A1 | 6/2015 | Richardson et al. |
| 2015/0172414 A1 | 6/2015 | Richardson et al. |
| 2015/0172415 A1 | 6/2015 | Richardson et al. |
| 2015/0188734 A1 | 7/2015 | Petrov |
| 2015/0189042 A1 | 7/2015 | Sun et al. |
| 2015/0195244 A1 | 7/2015 | Richardson et al. |
| 2015/0200991 A1 | 7/2015 | Kwon |
| 2015/0207733 A1 | 7/2015 | Richardson et al. |
| 2015/0215656 A1 | 7/2015 | Pulung et al. |
| 2015/0229710 A1 | 8/2015 | Sivasubramanian et al. |
| 2015/0244580 A1 | 8/2015 | Saavedra |
| 2015/0256647 A1 | 9/2015 | Richardson et al. |
| 2015/0271031 A1 | 9/2015 | Beevers |
| 2015/0288647 A1 | 10/2015 | Chhabra et al. |
| 2015/0317118 A1 | 11/2015 | Orikasa et al. |
| 2015/0319260 A1 | 11/2015 | Watson |
| 2015/0339136 A1 | 11/2015 | Suryanarayanan et al. |
| 2015/0341431 A1 | 11/2015 | Hartrick et al. |
| 2015/0095516 A1 | 12/2015 | Bergman |
| 2015/0358276 A1 | 12/2015 | Liu et al. |
| 2015/0358436 A1 | 12/2015 | Kim et al. |
| 2015/0363113 A1 | 12/2015 | Rahman et al. |
| 2015/0363282 A1 | 12/2015 | Rangasamy |
| 2016/0006672 A1 | 1/2016 | Saavedra |
| 2016/0021197 A1 | 1/2016 | Pogrebinsky et al. |
| 2016/0026568 A1 | 1/2016 | Marshall et al. |
| 2016/0028598 A1 | 1/2016 | Khakpour et al. |
| 2016/0028755 A1 | 1/2016 | Vasseur et al. |
| 2016/0036857 A1 | 2/2016 | Foxhoven et al. |
| 2016/0041910 A1 | 2/2016 | Richardson et al. |
| 2016/0065475 A1 | 3/2016 | Hilt et al. |
| 2016/0065665 A1 | 3/2016 | Richardson et al. |
| 2016/0072669 A1 | 3/2016 | Saavedra |
| 2016/0072720 A1 | 3/2016 | Richardson et al. |
| 2016/0104346 A1 | 4/2016 | Ovalle et al. |
| 2016/0132600 A1 | 5/2016 | Woodhead et al. |
| 2016/0142251 A1 | 5/2016 | Contreras et al. |
| 2016/0182454 A1 | 6/2016 | Phonsa et al. |
| 2016/0182542 A1 | 6/2016 | Staniford |
| 2016/0241637 A1 | 8/2016 | Marr et al. |
| 2016/0241639 A1 | 8/2016 | Brookins et al. |
| 2016/0253262 A1 | 9/2016 | Nadgowda |
| 2016/0255042 A1 | 9/2016 | Newton |
| 2016/0269927 A1 | 9/2016 | Kim et al. |
| 2016/0274929 A1 | 9/2016 | King |
| 2016/0294678 A1 | 10/2016 | Khakpour et al. |
| 2016/0337426 A1 | 11/2016 | Shribman et al. |
| 2016/0366202 A1 | 12/2016 | Phillips et al. |
| 2017/0041428 A1 | 2/2017 | Katsev |
| 2017/0099254 A1 | 4/2017 | Leach et al. |
| 2017/0099345 A1 | 4/2017 | Leach |
| 2017/0109316 A1 | 4/2017 | Hack et al. |
| 2017/0126796 A1 | 5/2017 | Hollis et al. |
| 2017/0142062 A1 | 5/2017 | Richardson et al. |
| 2017/0153980 A1 | 6/2017 | Araújo et al. |
| 2017/0155678 A1 | 6/2017 | Araújo et al. |
| 2017/0155732 A1 | 6/2017 | Araújo et al. |
| 2017/0163425 A1 | 6/2017 | Kaliski, Jr. |
| 2017/0170973 A1 | 6/2017 | Gill et al. |
| 2017/0171146 A1 | 6/2017 | Sharma et al. |
| 2017/0180217 A1 | 6/2017 | Puchala et al. |
| 2017/0180267 A1 | 6/2017 | Puchala et al. |
| 2017/0214761 A1 | 7/2017 | Hsu et al. |
| 2017/0250821 A1 | 8/2017 | Richardson et al. |
| 2017/0257340 A1 | 9/2017 | Richardson et al. |
| 2017/0353395 A1 | 12/2017 | Richardson et al. |
| 2018/0063027 A1 | 3/2018 | Rafferty |
| 2018/0063193 A1 | 3/2018 | Chandrashekhar et al. |
| 2018/0077109 A1 | 3/2018 | Hoeme et al. |
| 2018/0077110 A1 | 3/2018 | Huston, III et al. |
| 2018/0097631 A1 | 4/2018 | Uppal et al. |
| 2018/0097634 A1 | 4/2018 | Uppal et al. |
| 2018/0097831 A1 | 4/2018 | Uppal et al. |
| 2018/0109553 A1 | 4/2018 | Radlein et al. |
| 2018/0159757 A1 | 6/2018 | Uppal et al. |
| 2018/0159769 A1 | 6/2018 | Richardson et al. |
| 2018/0167444 A1 | 6/2018 | Sivasubramanian et al. |
| 2018/0167469 A1 | 6/2018 | Sivasubramanian et al. |
| 2018/0173526 A1 | 6/2018 | Prinsloo et al. |
| 2018/0183689 A1 | 6/2018 | Ellsworth et al. |
| 2018/0191817 A1 | 7/2018 | Richardson et al. |
| 2018/0212880 A1 | 7/2018 | Mostert |
| 2018/0213052 A1 | 7/2018 | Maccarthaigh et al. |
| 2018/0246982 A1* | 8/2018 | Lepeska .............. G06F 16/9566 |
| 2018/0278717 A1 | 9/2018 | Richardson et al. |
| 2018/0287916 A1 | 10/2018 | Mizik et al. |
| 2018/0302322 A1 | 10/2018 | Richardson et al. |
| 2018/0332107 A1 | 11/2018 | Marr et al. |
| 2018/0351904 A1 | 12/2018 | Mizik et al. |
| 2018/0367498 A1 | 12/2018 | Bliss et al. |
| 2019/0007515 A1 | 1/2019 | Baldwin et al. |
| 2019/0020562 A1 | 1/2019 | Richardson et al. |
| 2019/0028562 A1 | 1/2019 | Watson et al. |
| 2019/0044787 A1 | 2/2019 | Richardson et al. |
| 2019/0044846 A1 | 2/2019 | Howard et al. |
| 2019/0073303 A1 | 3/2019 | Marshall et al. |
| 2019/0089542 A1 | 3/2019 | Richardson et al. |
| 2019/0098109 A1 | 3/2019 | Watson |
| 2019/0121739 A1 | 4/2019 | Richardson et al. |
| 2019/0129908 A1 | 4/2019 | Kumarasamy |
| 2019/0140922 A1 | 5/2019 | Ellsworth et al. |
| 2019/0173941 A1 | 5/2019 | Puchala et al. |
| 2019/0173972 A1 | 6/2019 | MacCarthaigh et al. |
| 2019/0190998 A1 | 6/2019 | Sivasubramanian et al. |
| 2019/0222666 A1 | 6/2019 | Uppal et al. |
| 2019/0268265 A1 | 7/2019 | Richardson et al. |
| 2019/0297137 A1 | 9/2019 | Richardson et al. |

FOREIGN PATENT DOCUMENTS

| | | |
|---|---|---|
| CN | 1422468 A | 6/2003 |
| CN | 1511399 A | 7/2004 |
| CN | 1605182 A | 4/2005 |
| CN | 101189598 A | 5/2008 |
| CN | 101460907 A | 6/2009 |
| CN | 103731481 A | 4/2014 |
| EP | 1603307 A2 | 12/2005 |
| EP | 1351141 A2 | 10/2007 |
| EP | 2008167 A2 | 12/2008 |
| EP | 3156911 A1 | 4/2017 |
| JP | 07-141305 | 6/1995 |
| JP | 2001-0506093 | 5/2001 |
| JP | 2001-249907 | 9/2001 |
| JP | 2002-024192 | 1/2002 |
| JP | 2002-044137 | 2/2002 |
| JP | 2002-323986 | 11/2002 |

(56) References Cited

FOREIGN PATENT DOCUMENTS

| | | |
|---|---|---|
| JP | 2003-167810 A | 6/2003 |
| JP | 2003-167813 A | 6/2003 |
| JP | 2003-188901 A | 7/2003 |
| JP | 2003-522358 A | 7/2003 |
| JP | 2004-070935 | 3/2004 |
| JP | 2004-532471 | 10/2004 |
| JP | 2004-533738 A | 11/2004 |
| JP | 2005-537687 | 12/2005 |
| JP | 2007-133896 A | 5/2007 |
| JP | 2007-207225 A | 8/2007 |
| JP | 2008-515106 A | 5/2008 |
| JP | 2009-071538 A | 4/2009 |
| JP | 2012-509623 | 4/2012 |
| JP | 2012-209623 | 10/2012 |
| WO | WO 2002/069608 A2 | 9/2002 |
| WO | WO 2005/071560 A1 | 8/2005 |
| WO | WO 2007/007960 A1 | 1/2007 |
| WO | WO 2007/126837 A2 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012065641 A1 | 5/2012 |
| WO | WO 2014/047073 A1 | 3/2014 |
| WO | WO 2017/106455 A1 | 6/2017 |

OTHER PUBLICATIONS

N. R. Mabroukeh and C. I. Ezeife, "Semantic-Rich Markov Models for Web Prefetching," 2009 IEEE International Conference on Data Mining Workshops, Miami, FL, 2009, pp. 465-470. (Year: 2009).*
T.P. Tran et al. "An Efficient Web-Page Recommender System using Frequent Pattern Discovery and Dynamic Markov Models". International Journal of Web Application vol. 3 No. 1 Mar. 2011. pp. 1-11. (Year: 2011).*
N. J. Tuah, M. Kumar, and S. Venkatesh. 2003. Resource-aware speculative prefetching in wireless networks. Wirel. Netw. 9, 1 (Jan. 2003), pp. 61-72. (Year: 2003).*
X. Gu and Z. Li, "Application of the Data Mining in the Personalized Information Service," 2011 International Conference on Management and Service Science, Wuhan, 2011, pp. 1-4. (Year: 2011).*
Z. Jiang and L. Kleinrock, "An adaptive network prefetch scheme," in IEEE Journal on Selected Areas in Communications, vol. 16, No. 3, pp. 358-368, Apr. 1998. (Year: 1998).*
Office Action in Application No. 09729072.0 dated May 14, 2018.
Examination Report in Indian Application No. 6213/CHENP/2010 dated May 23, 2018.
International Preliminary Report on Patentability in PCT/US/2016/066848 dated Jun. 19, 2018.
"Non-Final Office Action dated Jan. 3, 2012," U.S. Appl. No. 12/652,541, filed Jan. 3, 2012; 35 pages.
"Final Office Action dated Sep. 5, 2012," U.S. Appl. No. 12/652,541, filed Sep. 5, 2012; 40 pages.
"Notice of Allowance dated Jan. 4, 2013," U.S. Appl. No. 12/652,541, filed Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdelivery network&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.

"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Armour et al.: "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls,";login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.

(56) References Cited

OTHER PUBLICATIONS

Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, In Proc. Of Networking 2005, all pages.
Gunther et al, "Measuring Round Trip Times to determine the Distance between WLAN Nodes", Dec. 18, 2004, Technical University Berlin, all pages.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Kenshi, P., "Help File Library: Iptables Basics," Justlinux, retrieved Dec. 1, 2005, from http://www.justlinux.com/nhf/Security/Iptables_Basics.html, 4 pages.
Krsul et al., "VMPlants: Providing and Managing Virtual Machine Execution Environments for Grid Computing", Nov. 6, 2004 (Nov. 6, 2004), Supercomputing, 2004. Proceedings of the ACM/IEEE SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Shankland, S., "Sun to buy start-up to bolster N1," Jul. 30, 2003, CNet News.com, retrieved May 3, 2006, http://news.zdnet.com/2100-3513_22-5057752.html, 8 pages.
Sharif et al, "Secure In-VM Monitoring Using Hardware Virtualization", Microsoft, Oct. 2009 http://research.microsoft.com/pubs/153179/sim-ccs09.pdf; 11 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zhao et al., "Distributed file system support for virtual machines in grid computing", Jun. 4, 2004 (Jun. 4, 2004), High Performance Distributed Computing, 2004. Proceedings. 13th IEEE International Symposium on Honolulu, HI, USA Jun. 4-6, 2004, Piscataway, NJ, USA, IEEE, pp. 202-211.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.

(56) References Cited

OTHER PUBLICATIONS

Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
Fifth Office Action in Chinese Application No. 200980111426.1 dated Aug. 14, 2015.
First Office Action in Japanese Application No. 2011-502139 dated Nov. 5, 2013.
Decision of Rejection in Application No. 2011-502139 dated Jun. 30, 2014.
Office Action in Japanese Application No. 2011-502139 dated Aug. 17, 2015.
Office Action in Indian Application No. 5937/CHENP/2010 dated Jan. 19, 2018.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report in European Application No. 09839809.2 dated May 11, 2015.
Office Action in European Application No. 09839809.2 dated Dec. 8, 2016.
Office Action in Indian Application No. 6210/CHENP/2010 dated Mar. 27, 2018.
Supplementary European Search Report in Application No. 09728756.9 dated Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Office Action in Japanese Application No. 2014-225580 dated Oct. 26, 2015.
Office Action in Japanese Application No. 2014-225580 dated Oct. 3, 2016.
Search Report and Written Opinion issued in Singapore Application No. 201006873-2 dated Oct. 12, 2011.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Japanese Application No. 2011-516466 dated May 30, 2016.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.

First Office Action in Canadian Application No. 2741895 dated Feb. 25, 2013.
Second Office Action in Canadian Application No. 2741895 dated Oct. 21, 2013.
Partial Supplementary Search Report in European Application No. 09826977.2 dated Oct. 4, 2016.
Search Report and Written Opinion in Singapore Application No. 201103333-9 dated Nov. 19, 2012.
Examination Report in Singapore Application No. 201103333-9 dated Aug. 13, 2013.
Office Action in Chinese Application No. 201310717573.1 dated Jul. 29, 2016.
Office Action in European Application No. 11767118.0 dated Feb. 3, 2017.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Second Office Action in Chinese Application No. 201180046104.0 dated Sep. 29, 2015.
Third Office Action in Chinese Application No. 201180046104.0 dated Apr. 14, 2016.
Decision of Rejection in Chinese Application No. 201180046104.0 dated Oct. 17, 2016.
Examination Report in Singapore Application No. 201301573-0 dated Dec. 22, 2014.
International Preliminary Report on Patentability in PCT/US2011/061486 dated May 22, 2013.
International Search Report and Written Opinion in PCT/US2011/061486 dated Mar. 30, 2012 in 11 pages.
Office Action in Canadian Application No. 2816612 dated Nov. 3, 2015.
Office Action in Canadian Application No. 2816612 dated Oct. 7, 2016.
Office Action in Canadian Application No. 2816612 dated Aug. 8, 2017.
First Office Action in Chinese Application No. 201180053405.6 dated Feb. 10, 2015.
Second Office Action in Chinese Application No. 201180053405.6 dated Dec. 4, 2015.
Office Action in Japanese Application No. 2013-540982 dated Jun. 2, 2014.
Written Opinion in Singapore Application No. 201303521-7 dated May 20, 2014.
Office Action in Japanese Application No. 2015-533132 dated Apr. 25, 2016.
Office Action in Canadian Application No. 2884796 dated Apr. 28, 2016.
Office Action in Russian Application No. 2015114568 dated May 16, 2016.
Supplementary Examination Report in Singapore Application No. 11201501987U dated May 17, 2017.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Chinese Application No. 201310537815.9 dated Feb. 1, 2018.

(56) References Cited

OTHER PUBLICATIONS

Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 4 pages.
Office Action in Japanese Application No. 2015-075644 dated Apr. 5, 2016.
Office Action in European Application No. 07754164.7 dated Dec. 14, 2015.
Office Action in European Application No. 07754164.7 dated Jan. 25, 2018.
Office Action in Chinese Application No. 201310537815.9 dated Jul. 5, 2016.
Office Action in Chinese Application No. 201310537815.9 dated Jun. 2, 2017.
International Search Report and Written Opinion in PCT/US/2016/066848 dated May 1, 2017.
International Search Report and Written Opinion in PCT/US2017/055156 dated Dec. 13, 2017.
Arends et al., DNS Security Introduction and Requirements, RFC 4033, Mar. 2005, 21 pages.
Ariyapperuma et al., "Security Vulnerabilities in DNS and DNSSEC." The Second International Conference on Availability, Reliability and Security, IEEE, 2007, 8 pages.
Chandramouli et al., "Challenges in Securing the Domain Name System." IEEE Security & Privacy4.1 (2006),pp. 84-87.
Eastlake, Donald, Domain Name System Security Extensions, RFC 2535, Mar. 1999, 47 pages.
Office Action in Application No. 09729072.0 dated Dec. 7, 2018.
Examination Report in Indian Application No. 4487/DELNP/2013 dated Dec. 28, 2018.
Office Action in European Application No. 11767118.0 dated Jan. 29, 2019.
Examination Report in Indian Application No. 3105/DELNP/2013, dated Feb. 19, 2019.
Cohen et al., "Proactive Caching of DNS Records: Addressing a Performance Bottleneck", Proceedings of Saint 2001 Symposium on Applications and the Internet; 8-12, Jan. 8, 2001, IEEE Computer Society, pp. 85-94.
JH Software, Moving a DNS Server to a New IP Address, last updated Jan. 26, 2006, 1 page.
Office Action in European Application No. 11767118.0 dated Jul. 25, 2018.
Extended Search Report in European Application No. 18156163 dated Sep. 3, 2018.
Office Action in Chinese Application No. 2013800492635 dated Aug. 30, 2017.
Frangoudis et al., "PTPv2-based network load estimation and its application to QoE monitoring for Over-the-Top services", IEEE, The 5th International conference on Information, Intelligence, Systems and Applications, IISA 2014, XP032629858, Jul. 7, 2014, pp. 176-181.
Zaman et al., "Combinatorial Auction-Based Dynamic VM Provisioning and Allocation in Clouds", Department of Computer Science, Wayne State University, Sep. 2011 http://www.cs.wayne.edu/-dgrosu/pub/ccgrid12-symp.pdf.
Office Action in European Application No. 13770602.4 dated Mar. 11, 2019.
Extended European Search Report in Application No. 16876655.8 dated Aug. 20, 2019.
Partial Search Report in European Application No. 16876655.8 dated May 15, 2019.
International Preliminary Report on Patentability and Written Opinion in PCT/US2017/055156 dated Apr. 9, 2019.
International Search Report and Written Opinion in PCT/US2018/036634 dated Sep. 11, 2018.

\* cited by examiner

PREDICTIVE CONTENT PUSH-ENABLED CONTENT DELIVERY NETWORK

BACKGROUND

Some content providers attempt to facilitate the delivery of requested content, such as network pages (e.g., content pages, Web pages, etc.) and/or resources identified in network pages, through the utilization of a network storage provider or a content delivery network ("CDN") service provider. A network storage provider and a CDN service provider each typically maintain a number of computing devices in a communication network that can maintain content from various content providers. In turn, content providers can instruct, or otherwise suggest to, client computing devices to request some, or all, of the content provider's content from the network storage provider's or CDN service provider's computing devices.

As with content providers, network storage providers and CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
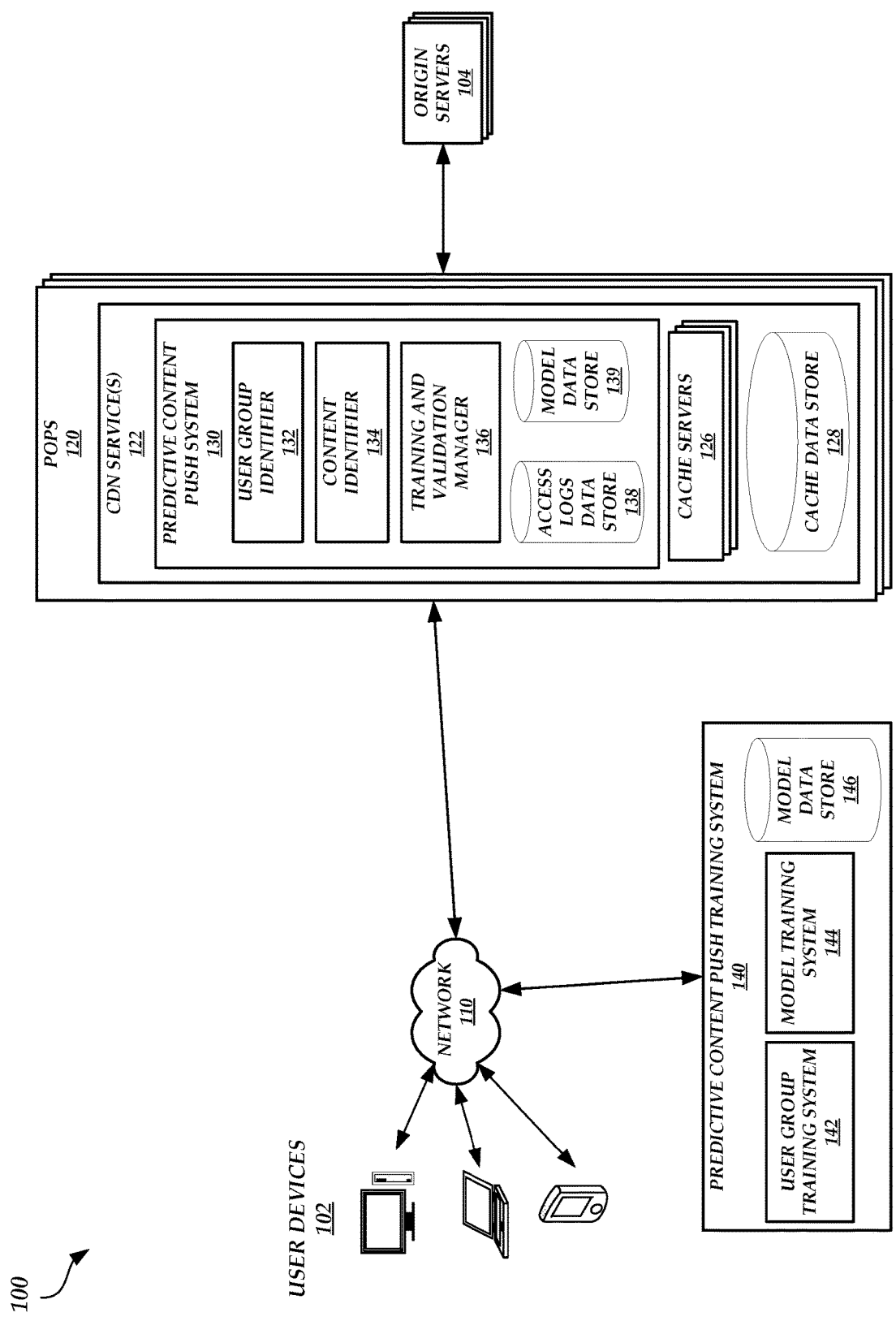
FIG. 1 is a block diagram of an illustrative operating environment in which a plurality of points of presence (POPs) may each implement a predictive content push-enabled CDN service.

Generally described, aspects of the present disclosure relate to a content delivery network ("CDN") that predicts content or network resources (e.g., a data object, such as a video file, an audio file, a script, an image, a document, etc.) that may be requested by a user device in the future and transmits or pushes such resources to the user device prior to receiving a request. The predictive techniques implemented by the CDN may reduce a latency of delivering requested content resources and/or a latency of the user device in rendering and displaying a content page (e.g., a network page, a Web page, etc.).

For example, a user device typically requests content resources from a CDN in response to a user providing an input indicating that the user would like to view a particular content page. The CDN can then retrieve the requested content resources from a local cache and/or an origin server, and forward the retrieved content resources to the user device. This process, however, may result in a delay noticeable to the user. In particular, a few seconds may pass between when the user provides an input requesting to view a content page and when the user device has retrieved the appropriate content resources and is able to render and display the requested content page. In some cases, the delay may be long enough such that the user attempts to request another content page.

Several factors may contribute to this delay. For example, the CDN may have to retrieve the requested content resources from an origin server. The time spent by the CDN to transmit a request to the origin server, by the origin server to retrieve the requested content resources from memory, and by the origin server to transmit the content resources to the CDN can contribute to the delay. As another example, the length of the delay may depend on the conditions of the network over which the user device and CDN communicate. The delay may increase if the network is congested, the available network bandwidth is limited, etc. As another example, the user device may have relatively few computing resources (e.g., disk space, central processing power, graphical processing power, memory, network bandwidth, internal bus capacity, etc.) available to render and display the content page and/or lack certain features (e.g., multiple central processing units (CPUs), a stand-alone graphics card, high performance random access memory (RAM), a high speed network interface, etc.) that may enable faster content resource retrieval and/or content page rendering.

A CDN service provider may not have control over certain factors that contribute to the delay, such as the network conditions and the user device capabilities. However, the CDN service provider can design the CDN service in such a way that the delay is reduced. For example, typical CDNs are designed to include a cache in which frequently-retrieved content resources are stored. Thus, for frequently-requested content resources, the time spent to retrieve such resources from the origin server can be eliminated. The cache, however, has a limited capacity and thus all requested content resources cannot be stored therein. Accordingly, users of user devices that requested infrequently-requested content resources may still experience significant delay. In fact, even if requested content resources are stored in the cache, a user may still experience significant delay due to poor network conditions and/or deficiencies in the capabilities of the user device.

Some CDNs attempt to address these issues by proactively transmitting content resources to a user device before the user device sends a request. For example, when a CDN transmits a request to an origin server for a first set of content resources, the origin server can generate a link header that points to content resources predicted to be requested by a user device in the future given the request for the first set of content resources. The origin server can transmit the first set of content resources and the link header to the CDN, the CDN can transmit the first set of content resources to the user device, and the CDN can use the link header to retrieve the content resources predicted to be requested by the user device in the future. The CDN can then transmit the predicted content resources to the user device.

However, the content resources pointed to by the link header are not determined based on any dynamic or real-time information. Rather, the content resources pointed to by the link header are pre-selected by a content page owner. The origin server does not necessarily take into account any characteristics of the user that may affect which content pages the user may view in the future, such as content pages previously viewed by the user, a location of the user, etc. Thus, the link header may be inaccurate and direct the CDN to retrieve a set of content resources that ultimately will not be requested by the user device, thereby further increasing the delay. In addition, the link header does not take into account current network conditions or the capabilities of the user device. Thus, situations can occur in which the link header instructs the CDN to transmit more content resources than can be handled by the network and/or user device, thereby congesting the network and/or the user device (and possibly preventing the user device from rendering the content resources). Conversely, situations may occur in which the link header instructs the CDN to transmit fewer content resources than can be handled by the network and/or user device, resulting in an under-utilization of the available computing and/or network resources.

To address these issues, the CDN described herein is designed to transmit content resources to a user device before the content resources are requested such that the effects of the delays caused by network conditions and/or user device capabilities are minimized. In particular, a predictive content push training system in the CDN environment can train various artificial intelligence models (e.g., stochastic models, such as Markov models, neural networks, etc., and/or combinations thereof) to predict content resources that may be requested by a user device in the future in light of user attributes, previous content pages visited by the user, and/or the like. The predictive content push training system can then distribute the artificial intelligence models to various CDNs. A CDN can use one or more of the artificial intelligence models to determine what additional content resources should be obtained in response to a user device requesting a first set of content resources. The CDN can transmit the first set of content resources to the user device. The CDN can also evaluate the current network conditions, the capabilities of the user device, and/or the like to determine how much additional content to transmit to the user device.

By using artificial intelligence and evaluating network conditions and/or user device capabilities, the CDN described herein may ultimately reduce content page load times more effectively than typical CDNs. The foregoing aspects and many of the attendant advantages of this disclosure will become more readily appreciated as the same become better understood by reference to the following detailed description, when taken in conjunction with the accompanying drawings.

Example Predictive Content Push Environment

FIG. 1 is a block diagram of an illustrative operating environment 100 in which a plurality of points of presence (POPs) 120 may each implement a predictive content push-enabled CDN service 122. The operating environment 100 may further include one or more user devices 102, one or more origin servers 104, and a predictive content push training system 140. The CDN service 122 may further implement a predictive content push system 130, one or more cache servers 126, and a cache data store 128. The various user devices 102 may communicate with the POPs 120 via a network 110 to request data objects. The predictive content push training system 140 can communicate with the POPs 120 via the network 110 to provide artificial intelligence models for predicting content resources to retrieve and transmit to user devices 102.

In some instances, a CDN may operate as a distributed system in which multiple POPs implement instances of the CDN. As used herein, a POP is intended to refer to any collection of related computing devices utilized to implement functionality on behalf of one or many providers. POPs are generally associated with a specific geographic location in which the computing devices implementing the POP are located, or with a region serviced by the POP. For example, a data center or a collection of computing devices within a data center may form a POP. A CDN may utilize multiple POPs that are geographically diverse, to enable users in a variety of geographic locations to quickly transmit and receive information (e.g., requested data objects) from the CDN. In some instances, the POPs may also implement other services in addition to the CDN services, such as data storage services, data processing services, etc.

While the user devices 102 and POPs 120 are shown as grouped within FIG. 1, the user devices 102 and POPs 120 may be geographically distant, and independently owned or operated. For example, the user devices 102 could represent a multitude of users in various global, continental, or regional locations accessing the POPs 120. Further, the POPs 120 may be globally, continentally, or regionally disparate, in order to provide a wide geographical presence for the CDN services 122. Accordingly, the groupings of user devices 102 and POPs 120 within FIG. 1 is intended to represent a logical, rather than physical, grouping.

The origin servers 104 may include any computing device owned or operated by an entity that has provided one or more sets of content ("distributions") to a CDN (e.g., CDN service 122) for subsequent transmission to user devices 102. For example, origin servers 104 may include servers hosting web sites, streaming audio, video, or multimedia services, data analytics services, or other network-accessible services. The origin servers 104 may include primary versions of content within various distributions. The primary versions of content may be retrieved by the various POPs 120 for subsequent transmission to the user devices 102. In an embodiment, the POPs 120 includes a cache that stores frequently-requested content (e.g., the cache data store 128). If requested content is not present in the POP 120 cache, then the POP 120 may retrieve the content from an origin server 104. In alternate embodiments, not shown, the POP 120 may first request the content from an intermediate cache housed within a regional data center. If the requested content is also not present in the intermediate cache, then the POP 120 may retrieve the content from an origin server 104.

Users, by way of user devices 102, may interact with a CDN service 122 of a POP 120 to request content resources (e.g., one or more data objects). In an embodiment, the CDN service 122 may include a host (not shown) that selects a cache server 126 to deliver the requested data object to the user device 102. A single POP 120 may include multiple hosts such that the POP 120 can service multiple data object requests simultaneously.

The CDN service 122 may initially collect data associated with various user devices 102 and/or content resource requests for training artificial intelligence models before providing the predictive content push functionality described herein. For example, the CDN service 122 can receive a request for one or more data objects from a user device 102. Alternatively, the CDN service 122 may receive a request for a content page from a user device 102, where the content page request references one or more data objects to retrieve. In general, the CDN service 122 may store attributes of users that operate the user devices 102 (e.g., user interests, user hobbies, user age, user gender, user demographic, user location, user purchase history, user browsing history, user search history and/or current search queries, user subscriptions, actions performed by the user in prior browsing sessions, parts of a screen a user typically clicks while browsing, etc.), attributes of the user devices 102 themselves (e.g., device location, device capabilities, etc.), and/or other contextual information (e.g., times a content page request is transmitted, attributes of other users in a similar location as the user or user device 102, etc.) (collectively referred to herein as "user attributes") locally or in a remote system (not shown). In some embodiments, different users may operate the same user device 102, and the CDN service 122 can distinguish between users (and thus store attributes for different users using the same user device 102) based on a logged-in user account, user patterns (e.g., user browsing patterns), etc. The CDN service 122 can then retrieve user attributes associated with the user device 102 that submitted the data object request and/or the user operating the user device 102, and transmit the user attributes and a request for the data object(s) to the origin server 104.

The origin server 104 can use the user attributes and/or an indication of the requested data object(s) to generate a link header. For example, the link header may include the user attributes. The link header may also point to one or more data objects predicted to be requested by the user device 102 in the future given the current data object request submitted by the user device 102. The origin server 104 can retrieve the requested data object(s) and transmit the requested data object(s) and the link header to the CDN service 122.

The CDN service 122 can use the received information to transmit data to the user device 102. For example, the CDN service 122 can forward the received data object(s) to the user device 102. Before, during, or after transmitting the received data object(s) to the user device 102, the CDN service 122 can also retrieve the data object(s) referenced in the link header (e.g., from the cache data store 128 and/or an origin server 104) and transmit some or all of these data object(s) to the user device 102 as well.

The predictive content push system 130 of the CDN service 122 may include a user group identifier 132, a content identifier 134, a training and validation manager 136, an access logs data store 138, and a model data store 139. The access logs data store 138 may store, in entries associated with specific users and/or user devices 102, logs indicating previous content pages requested by the user and/or user device 102, content pages visited by the user and/or user device 102 after requesting data object(s) for a specific content page, data object(s) pushed to user devices 102 prior to receiving a request for such data object(s) (e.g., as indicated by link headers), attributes of the user, and/or the like. After the CDN service 122 transmits data object(s) to the user device 102, the CDN service 122 can store the link header in the access logs data store 138 in an entry associated with the user device 102 that submitted the data object or content page request and/or the user operating the user device 102.

The CDN service 122 may repeat the above-described process for a plurality of data object or content page requests received from the various user devices 102. Thus, over time, the access logs data store 138 may store browsing history, link headers, user attributes, etc. for a wide variety of users and/or user devices 102.

After a threshold time period passes and/or after the amount of data stored in the access logs data store 138 reaches a certain amount, the training and validation manager 136 can retrieve the access logs from the access logs data store 138. The training and validation manager 136 can then forward the access logs to the predictive content push training system 140 via the network 110. Alternatively, the predictive content push training system 140 can request the access logs from the training and validation manager 136, and the training and validation manager 136 can then forward the access logs to the predictive content push training system 140.

The predictive content push training system 140 may be configured to train one or more artificial intelligence models for use by the CDN service 122. For example, the predictive content push training system 140 may include a user group training system 142, a model training system 144, and a model data store 146. The user group training system 142 may use the received access logs to group users and/or user devices 102 into one or more groups. In particular, the user group training system 142 may use unsupervised learning to identify one or more groups of users and/or user devices 102. For example, the user group training system 142 may analyze the access logs to identify behaviors exhibited by users and/or user devices 102. The user group training system 142 can use the analysis to identify a set of user attributes that are common to users and/or user devices 102 that exhibit similar behavior. The set of user attributes that are common to users and/or user devices 102 that exhibit similar behavior may then define a group of users and/or user devices 102. As an illustrative example, the user group training system 142 can analyze the access logs, which may indicate that users and/or user devices 102 from a first geographic region generally visit content page B after visiting content page A, whereas users and/or user devices 102 from a second geographic region generally visit content page C after visiting content page A. Thus, the user group training system 142 may define one group as those users and/or user devices 102 from the first geographic region and may define another group as those users and/or user devices 102 from the second geographic region.

Alternatively, the user group training system 142 does not group a plurality of users and/or user device 102 into one or more groups using the operations described above. Rather, the user group training system 142 simply associates each user and/or user device 102 with a separate group. Thus, the user group training system 142 may define a number of groups that equals a number of users and/or user devices 102 in communication with the CDN service 122.

In other embodiments, the group defined by the user group training system 142 does not necessarily correspond to user attributes of users and/or user devices 102 that exhibit similar behaviors (e.g., browsing history, browsing speed, etc.). Rather, the group may be defined based on user and/or user device 102 geographic location, user device 102 types and/or model types, individual content pages and/or domains, individual content page transitions, and/or the like.

The user group training system 142 can define one or more groups. The model training system 144 can then train one or more artificial intelligence models for each group. In particular, the model training system 144 may use supervised learning to train the models. The artificial intelligence models can be stochastic models (e.g., Markov models), neural networks, and/or the like, and/or combinations thereof. For example, the access logs associated with a user device 102 may indicate a browsing history of the user of the user device 102. The browsing history can include content pages requested by the user device 102, times that content pages were requested, and/or the order in which content pages were requested. As an illustrative example, the access logs associated with a user device 102 may indicate that the user device 102 requested content page A at time 1, then requested content page B after content page A at time 2, then requested content page C after content page B at time 3, and so on. Thus, the model training system 144 can, for a particular group, identify the access logs corresponding to user devices 102 that fall within the group and train one or more models using the identified access logs.

In an embodiment in which the trained models are Markov models (or other similar artificial intelligence models), the model training system 144 may train a model that includes one or more Markov chains comprised of various nodes (e.g., states) and directional arcs. Each node may represent a content page (or the data object(s) associated with a particular content page). Alternatively or in addition, a node may represent a plurality of content pages (or the data object(s) associated with the plurality of content pages). For example, a node may represent a plurality of content pages if the model training system 144 determines that user devices 102 exhibit similar behavior when transitioning from content pages in the plurality to other content pages (e.g., if the plurality of content pages includes content page A and content page B, a node may represent both content pages if the model training system 144 determines that user devices 102 transition from either content page A or content page B to content page C a high number of times and transition from either content page A or content page B to content page D a low number of times). The directional arcs may each be coupled between a first node and a second node and indicate a probability that a user device 102 may request a content page represented by the second node after requesting a content page represented by the first node (e.g., where the user device 102 requests a content page represented by the second node after requesting a content page represented by the first node when the user device 102 does not request another content page after requesting the content page represented by the first node and before requesting the content page represented by the second node).

The model training system 144 may determine the probabilities associated with the arcs based on the historical behavior of user devices 102 associated with the group for which the model is being trained as indicated by the access logs (e.g., based on, for one or more user devices 102, a content page that the respective user device 102 requested and/or N preceding content pages requested by the same respective user device 102). For example, the model training system 144 can construct a matrix of transition probabilities, where each probability corresponds to a transition from one content page to another content page. The model training system 144 can then iterate through the training data (e.g., the access logs) and, when a transition from one content page to another content page is identified, update the corresponding transition probability. As an illustrative example, if, in the aggregate, user devices 102 request content page B 40% of the time after requesting content page A and request content page C 60% of the time after requesting content page A, then the directional arc connecting the content page A node to the content page B node may be associated with a probability of 0.4 and the directional arc connecting the content page A node to the content page C node may be associated with a probability of 0.6.

For each group, the model training system 144 may train Markov models corresponding to particular content pages. For example, the content page to which a Markov model corresponds may be represented by a first node in the Markov model. Other nodes in the Markov model may represent other content pages that a user device 102 may request after requesting the content page represented by the first node. As described in greater detail below, the predictive content push system 130 may retrieve and apply the Markov model corresponding to a particular content page when a current content page of the user device 102 (e.g., the content page requested by a user device 102 in a current request and before the user device 102 submits a new content page or data object request) is the content page to which the Markov model corresponds. Thus, the model training system 144 may train a first Markov model in which the first node represents a first content page, a second Markov model in which the first node represents a second content page, and so on.

In further embodiments, the model training system 144 trains Markov models corresponding to a sequence of content pages. For example, the N content pages in the sequence to which a Markov model corresponds may be represented by the first N nodes in the Markov model (where N can be any integer, such as 1, 2, 3, 4, 5, etc.). Other nodes in the Markov model may represent other content pages that a user device 102 may request after requesting the N content pages in the sequence represented by the first N nodes. As described in greater detail below, the predictive content push system 130 may retrieve and apply the Markov model corresponding to a particular sequence of content pages when the previous N content pages requested by the user device 102 (e.g., the previous content pages requested by a user device 102 before the user device 102 submits a new content page or data object request) are the content pages in the sequence to which the Markov model corresponds. Thus, the model training system 144 may train a first Markov model in which the first N nodes represent a first set of N content pages, a second Markov model in which the first N nodes represent a second set of N content pages, and so on. In addition, for a particular group, the model training system 144 can train Markov models of different sizes. Thus, the model training system 144 may train a first Markov model in which the first N nodes represent a first set of N content pages, a second Markov model in which the first X nodes represent a set of X content pages, a third Markov model in which the first Y nodes represent a set of Y content pages, a fourth Markov model in which the first N nodes represent a second set of N content pages, and so on.

Additional details regarding trained Markov models are described below with respect to FIG. 5.

In embodiments in which the trained models are neural networks (or other similar artificial intelligence models), the model training system 144 may train a single neural network for each group using access logs associated with the respective group or a single neural network for all groups using all access logs. The neural network may include various layers of nodes, with weights and/or thresholds assigned to the various nodes. As described in greater detail below, the predictive content push system 130 may retrieve and apply the neural network corresponding to the group of the user device 102 requesting a new content page, with the neural network producing an output indicating data object(s) to retrieve given the previous N content pages requested by the user device 102 (e.g., where N can be any integer, such as 1, 2, 3, 4, 5, etc.).

The model training system 144 can store trained models in the model data store 146. The models may be stored in an entry associated with a particular group. As described below, the model training system 144 can later retrieve the models stored in the model data store 146 to update the models.

Thus, the user group training system 142 can define one or more groups. For each group, the model training system 144 can then train one or more artificial intelligence models, such as separate artificial intelligence models for individual content pages that a user device 102 may request and/or separate artificial intelligence models for sequences of content pages that a user device 102 may request. Accordingly, the predictive content push training system 140 can generate a plurality of artificial intelligence models that are associated with various groups. The predictive content push training system 140 can transmit the artificial intelligence models and/or an indication of the various groups to the predictive content push system 130 (independently, such as when the training is complete, or at the request of the predictive content push system 130), and the predictive content push system 130 can use the artificial intelligence models and/or an indication of the various groups to retrieve and transmit content to the user devices 102.

For example, the predictive content push system 130 can store the received artificial intelligence models in the model data store 139 in entries associated with different groups. In response to the CDN service 122 (e.g., a cache server 126) receiving, from a user device 102, a request for a content page or data object(s) associated with a content page, the CDN service 122 (e.g., the cache server 126) can transmit to the origin server 104 a request for data object(s) associated with the content page, providing user attributes associated with the user device 102 and/or the user operating the user device 102 along with the request.

The origin server 104 can use the user attributes and/or an indication of the requested data object(s) to generate a link header. For example, the link header may include the user attributes. The link header may also point to one or more data objects predicted to be requested by the user device 102 in the future given the current data object request submitted by the user device 102. The origin server 104 can retrieve the requested data object(s) and transmit the requested data object(s) and the link header to the CDN service 122 (e.g., the cache server 126). The CDN service 122 (e.g., the cache server 126) can then transmit the requested data object(s) to the user device 102 and forward the link header to the user group identifier 132. Alternatively, the origin server 104 can transmit the requested data object(s) to the CDN service 122, the CDN service 122 can transmit the requested data object(s) to the user device 102, and then the origin server 104 can generate and/or transmit the link header to the CDN service 122.

Alternatively, the CDN service 122 does not transmit a request for data object(s) to the origin server 104 to obtain a link header. For example, the requested data object(s) may already be stored in the cache data store 128. As another example, the CDN service 122 may determine which data object(s) to proactively retrieve and transmit to the user device 102 without using link headers (e.g., the artificial intelligence models may replace the functionality provided by the link headers).

The user group identifier 132 can then identify the group to which the user of the user device 102 or the user device 102 itself corresponds using the user attributes. In general, the user group identifier 132 can identify the group based on the request context (e.g., contextual information associated with the content page request received from the user device 102, which can include the user attributes). The user group identifier 132 can identify the user attributes by processing the link header or, if the link header is not provided, by retrieving the user attributes from a local or external data store (not shown). The user group identifier 132 can compare the identified user attributes to the user attributes that define the various groups (or compare other information, such as user or user device 102 location, requested content page, a transition from a previous content page to a current content page, etc., that may define the various groups), identifying the group to which the content page request is associated (e.g., the group to which the user of the user device 102 or the user device 102 itself corresponds) as the group defined by user attributes that match or at least partially match the identified user attributes.

Once the group is identified, the content identifier 134 can determine the quantity of data objects to proactively transmit to the user device 102 and the specific data objects to transmit. For example, when the user device 102 requests data object(s) or a content page from the CDN service 122, a transmission control protocol (TCP) connection may be established between the user device 102 and the CDN service 122 via the network 110. The CDN service 122 can then transmit test packets to identify the current or real-time conditions of the network 110 in which the user device 102 and the CDN service 122 are communicating. In addition, the CDN service 122 can receive information indicating the capabilities of the user device 102 (e.g., by requesting such information from the user device 102 or by receiving such information from the user device 102 without submitting a request). The capabilities of the user device 102 can include an amount of available and/or total disk space, a number of CPUs, the processing capabilities of the CPU(s), a number of graphical processing units (GPUs), the processing capabilities of the GPU(s), an amount of available and/or total RAM, a type of network interface and/or transmission capabilities of the network interface, a current processing load of the user device 102, a screen resolution of a user interface, an internal bus capacity, etc.

Using the current conditions of the network 110 and/or the user device 102 capabilities, the content identifier 134 determines the quantity of data objects to proactively transmit to the user device. For example, the content identifier 134 may determine the number and/or size of data objects that can be transmitted to the user device 102 without exceeding the maximum available bandwidth (e.g., maximum available data transfer rate, maximum available data throughput, etc.) of the network 110 (or without causing the available bandwidth of the network 110 as a percentage of the total bandwidth of the network 110 to drop below a threshold value, such as 10%, 20%, etc.) and/or without causing the user device 102 to be congested and possibly inoperable (e.g., the content identifier 134 can determine a maximum number and/or size of data objects that user device 102 can process during a threshold period of time given the user device 102 capabilities). The determined number and/or size of data objects that can be transmitted to the user device 102 may also be referred to herein as the "data object quantity limit." Optionally, the content identifier 134 further determines the speed at which to transmit the data objects. For example, the content identifier 134 can use the current network 110 conditions and/or the user device 102 capabilities to identify the maximum data transfer speed that the network 110 can handle and the maximum amount of data that the user device 102 can process at any one time. The content identifier 134 can then set the data object transfer speed as the minimum of the maximum data transfer speed that the network 110 can handle and the maximum amount of data that the user device 102 can process per time unit (e.g., millisecond, second, minute, etc.).

Before or after determining the quantity of data objects to transmit to the user device 102, the content identifier 134 can identify the specific data objects to transmit to the user device 102. For example, the content identifier 134 can retrieve the artificial intelligence model(s) stored in the model data store 139 that are associated with the group to which the user device 102 corresponds. The content identifier 134 can then identify one or more of the retrieved artificial intelligence models that is associated with a current content page (e.g., the content page requested by the user device 102), N previous content pages (e.g., content pages requested by the user device 102 prior to the current content page), and/or data objects associated with the current and/or previous content pages. Once identified, the content identifier 134 can apply the corresponding artificial intelligence model(s) to determine what data object(s) to transmit to the user device 102.

For example, in embodiments in which the artificial intelligence models are Markov models (or other similar artificial intelligence models), each model may indicate the probabilities associated with the various directional arcs extending from the node representing the current content page. The content identifier 134 can identify data object(s) associated with the content page represented by the node that has the highest probability directional arc extending from the current content page node, and retrieve such data object(s) (e.g., from the cache data store 128 and/or the origin server 104). The content identifier 134 can then determine whether the quantity (e.g., number and/or size) of these data object(s) exceeds the data object quantity limit. If the quantity of these data object(s) does not exceed the data object quantity limit, then the content identifier 134 can transmit these data object(s) to the user device 102, identify data object(s) associated with the content page represented by the node that has the next highest probability directional arc extending from the current content page node, retrieve these data object(s), and determine whether the quantity of these data object(s) and the data object(s) already transmitted to the user device 102 exceed the data object quantity limit. If the quantity of these data object(s) and the data object(s) already transmitted to the user device 102 do not exceed the data object quantity limit, then the content identifier 134 can repeat this process for the content page represented by the node that has the third highest probability directional arc extending from the current content page node, and so on. However, if at any point the quantity of data object(s) (either transferred or retrieved and not yet transferred) exceeds the data object quantity limit, then the content identifier 134 may transmit a portion of the retrieved data object(s) such that the data object quantity limit is not exceeded (if applicable) and cease transmission of any further data object(s) to the user device 102. In this way, the content identifier 134 can maximize or nearly maximize the bandwidth of the network 110 and/or the capabilities of the user device 102 without congesting either the network 110 or the user device 102.

As another example, in embodiments in which the artificial intelligence models are neural networks (or other similar artificial intelligence models), each model may output an ordered list of content pages that the user device 102 may request in the future given the current request, where the list is ordered from the content page most likely to be requested to the content page least likely to be requested. The content identifier 134 can identify data object(s) associated with the content page most likely to be requested, and retrieve such data object(s) (e.g., from the cache data store 128 and/or the origin server 104). The content identifier 134 can then determine whether the quantity (e.g., number and/or size) of these data object(s) exceeds the data object quantity limit. If the quantity of these data object(s) does not exceed the data object quantity limit, then the content identifier 134 can transmit these data object(s) to the user device 102, identify data object(s) associated with the content page second most likely to be requested, retrieve these data object(s), and determine whether the quantity of these data object(s) and the data object(s) already transmitted to the user device 102 exceed the data object quantity limit. If the quantity of these data object(s) and the data object(s) already transmitted to the user device 102 do not exceed the data object quantity limit, then the content identifier 134 can repeat this process for the content page third most likely to be requested, and so on. However, if at any point the quantity of data object(s) (either transferred or retrieved and not yet transferred) exceeds the data object quantity limit, then the content identifier 134 may transmit a portion of the retrieved data object(s) such that the data object quantity limit is not exceeded (if applicable) and cease transmission of any further data object(s) to the user device 102. As described above, in this way, the content identifier 134 can maximize or nearly maximize the bandwidth of the network 110 and/or the capabilities of the user device 102 without congesting either the network 110 or the user device 102

In some embodiments, the content identifier 134 considers the quantity of data object(s) corresponding to the request received from the user device 102 in determining whether the data object quantity limit is exceeded. For example, the content identifier 134 (or another component of the CDN service 122) can retrieve and transmit to the user device 102 data object(s) corresponding to the request received from the user device 102. The requested data object(s) may be transmitted to the user device 102 prior to the content identifier 134 using artificial intelligence model(s) and/or a link header to identify and transmit data object(s) corresponding to content pages that the user device 102 may request in the future. Transmission, by the content identifier 134, and reception, by the user device 102, of the requested data object(s), however, may affect the available bandwidth of the network 110 and/or the amount of additional data that the user device 102 can process. The requested data object(s) may take priority over data object(s) the content identifier 134 predicts the user device 102 may request in the future, and therefore the content identifier 134 may transmit the requested data object(s) first, optionally without determining the network 110 conditions and/or the user device 102 capabilities. The content identifier 134 may then determine the data object quantity limit taking into account that the quantity of the requested data object(s) have been transmitted to the user device 102. If, after transmitting the requested data object(s), the data object quantity limit is not exceeded, then the content identifier 134 may proceed to retrieve and transmit to the user device 102 additional data object(s) that the content identifier 134 predicts the user device 102 may request in the future in accordance with the operations described above. In other embodiments, the content identifier 134 does not consider the quantity of data object(s) corresponding to the request received from the user device 102 in determining whether the data object quantity limit is exceeded (e.g., the content identifier 134 does not take into account the quantity of the requested data object(s) transmitted to the user device 102 in determining the data object quantity limit). For example, the content identifier 134 may initially transmit the requested data object(s) to the user device 102 and then, after a threshold time period passes, transmit additional data object(s) to the user device 102 that the content identifier 134 predicts the user device 102 may request in the future. Because there may be a delay between transmission of the requested data object(s) and transmission of not yet-requested data object(s), congestion of the network 110 and/or the user device 102 may be less of a concern.

In addition to facilitating the training of artificial intelligence models by the predictive content push training system 140, the training and validation manager 136 can validate results produced by one or more of the artificial intelligence models and provide feedback to the predictive content push training system 140 such that the predictive content push training system 140 can improve the predictive abilities of some or all of the artificial intelligence models. For example, after the content identifier 134 predicts which data object(s) the user device 102 may request in the future given a first content page (or data object) request, the CDN service 122 may receive a second content page request from the user device 102. The training and validation manager 136 can then compare the data object(s) predicted to be requested by the user device 102 with the data object(s) corresponding to the content page requested in the second content page request. The training and validation manager 136 can store information identifying a difference between the predicted and actual requested data object(s) and/or information identifying that there is no difference between the predicted and actual requested data object(s) in the access logs data store 138. As another example, after the content identifier 134 predicts data object(s) to retrieve in response to the content page request transmitted by the user device 102, the training and validation manager 136 can compare the data object(s) predicted to be requested by the user device 102 with data object(s) referenced by the link header received from the origin server 104 in response to the content page transmitted by the user device 102. Any differences (or lack of differences) between the artificial intelligence model-predicted data object(s) and the data object(s) referenced in the link header can be stored by the training and validation manager 136 in the access logs data store 138.

Periodically and/or in response to a request by the predictive content push training system 140, the training and validation manager 136 can retrieve access logs from the access logs data store 138 (e.g., the N most recent access logs, the access logs stored within the last X minutes, etc.) and transmit the access logs to the predictive content push training system 140. The user group training system 142 can then use the access logs to update the group definitions (e.g., where an update may occur if there is a difference between predicted data object(s) and actual requested data object(s) and/or between predicted data object(s) and link header-referenced data object(s)) and/or the model training system 144 can use the access logs to update or re-train one or more of the artificial intelligence models stored in the model data store 146 (e.g., where an update may occur if there is a difference between predicted data object(s) and actual requested data object(s) and/or between predicted data object(s) and link header-referenced data object(s)). For example, the model training system 144 can retrieve artificial intelligence models from the model data store 146 that correspond with the access logs received from the training and validation manager 136 (e.g., an artificial intelligence model corresponds with an access log if the access log indicates differences (or lack of differences) between actual or link header-referenced data object(s) and data object(s) predicted using the artificial intelligence model). The model training system 144 can then optionally update or re-train the retrieved artificial intelligence models using the received access logs as training data. Once updated or re-trained, the model training system 144 can store the updated or re-trained artificial intelligence models in the model data store 146. The predictive content push training system 140 can also transmit the updated groups and/or the updated or re-trained artificial intelligence models to the various POPs 120 (e.g., the various CDN services 122) for use in processing future content page (or data object) requests. In this way, the predictive content push training system 140 can improve the predictive abilities of the CDN service 122 (e.g., the content identifier 134) for future requests, which may result in a more efficient use of the available network 110 bandwidth and/or the user device 102 capabilities, a reduction in the likelihood that the network 110 and/or the user device 102 becomes congested, and/or a reduction in the user device 102 retrieval and rendering latency.

As described herein, each POP 120 is a collection of related computing devices utilized to implement CDN functionality on behalf of one or many providers. For example, the predictive content push systems 130, the one or more cache servers 126, and/or the cache data store 128 may each be implemented by one or more related computing devices (e.g., devices that include one or more processors, memory, input/output interfaces, networking interfaces, etc. to implement the functionality described herein). Each POP 120 may be generally associated with a specific geographic location in which the computing devices implementing the respective POP 120 are located, or with a region serviced by the respective POP 120. For example, a data center or a collection of computing devices within a data center may form a POP 120. A CDN may utilize multiple POPs 120 that are geographically diverse, to enable users in a variety of geographic locations to quickly transmit and receive information (e.g., requested data objects) from the CDN. In some instances, the POPs 120 may also implement other services in addition to the CDN services 122, such as data storage services, data processing services, etc.

The CDN services 122 may operate in a distributed computing environment including several computer systems that are interconnected using one or more computer networks (not shown in FIG. 1). The CDN services 122 could also operate within a computing environment having a fewer or greater number of devices than are illustrated in FIG. 1. For example, the CDN services 122 are depicted as including one or more cache servers 126 and a cache data store 128, but the one or more cache servers 126 and/or the cache data store 128 may be implemented by computing devices located external to the POPs 120. Thus, the depiction of the CDN services 122 in FIG. 1 should be taken as illustrative and not limiting to the present disclosure. For example, the CDN services 122 or various constituents thereof could implement various Web services components, hosted or "cloud" computing environments, and/or peer to peer network configurations to implement at least a portion of the processes described herein. Further, the CDN services 122 may be implemented directly in hardware or software executed by hardware devices and may, for instance, include one or more physical or virtual servers implemented on physical computer hardware configured to execute computer executable instructions for performing various features that are described herein.

While the access logs data store 138 and the model data store 139 are depicted as being internal to the predictive content push system 130, this is not meant to be limiting. For example, the access logs data store 138 and/or the model data store 139 can be located external to the predictive content push system 130 (e.g., within the CDN service 122, within the POP 120, external to the POP 120, etc.).

The predictive content push training system 140 may be a single computing device, or may include multiple distinct computing devices, such as computer servers, logically or physically grouped together to collectively operate as a server system. The components of the action delivery system 120 and/or the model updater 130 can each be implemented in application-specific hardware (e.g., a server computing device with one or more ASICs) such that no software is necessary, or as a combination of hardware and software. In addition, the modules and components of the predictive content push training system 140 can be combined on one server computing device or separated individually or into groups on several server computing devices. In some embodiments, the predictive content push training system 140 may include additional or fewer components than illustrated in FIG. 1.

The predictive content push training system 140 may be located external to the POPs 120 such that a single predictive content push training system 140 can perform model training and push new models and/or updated or re-trained models to the various POPs 120. However, in other embodiments, not shown, the predictive content push training system 140 may be internal to a POP 120.

While the model data store 146 is depicted as being internal to the predictive content push training system 140, this is not meant to be limiting. For example, the model data store 146 can be located external to the predictive content push training system 140.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., a browser) that submits requests for content pages or data objects to the POPs 120 when, for example, a user attempts to view a content page (e.g., a network page, a Web page, etc.).

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example Block Diagrams for Training Artificial Intelligence Models

Figure 2A:
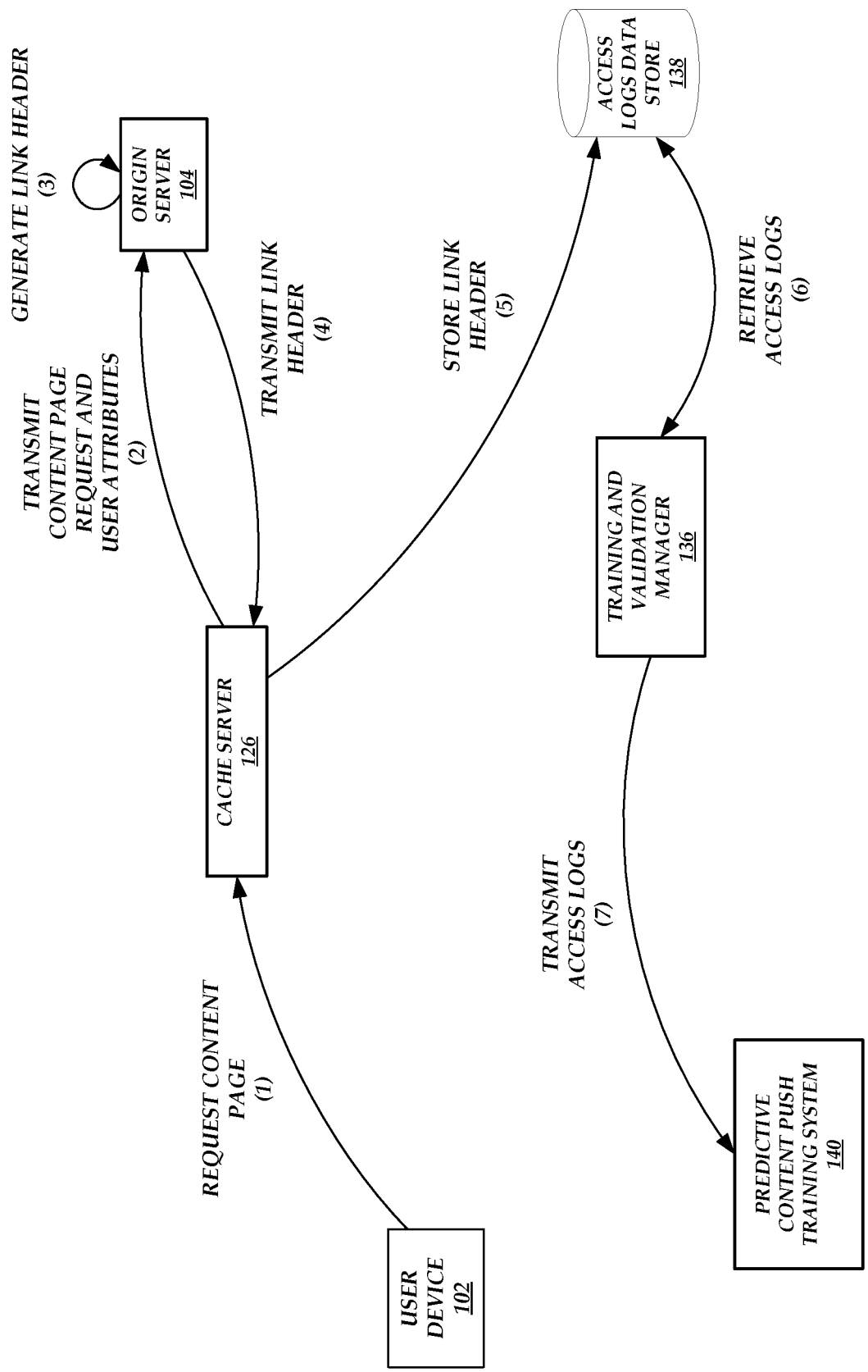
FIGS. 2A-2B are block diagrams of the operating environment of FIG. 1 illustrating the operations performed by the components of the operating environment to train artificial intelligence models for use in predicting data object(s) that a user device may request in the future, according to one embodiment.
Figure 2B:
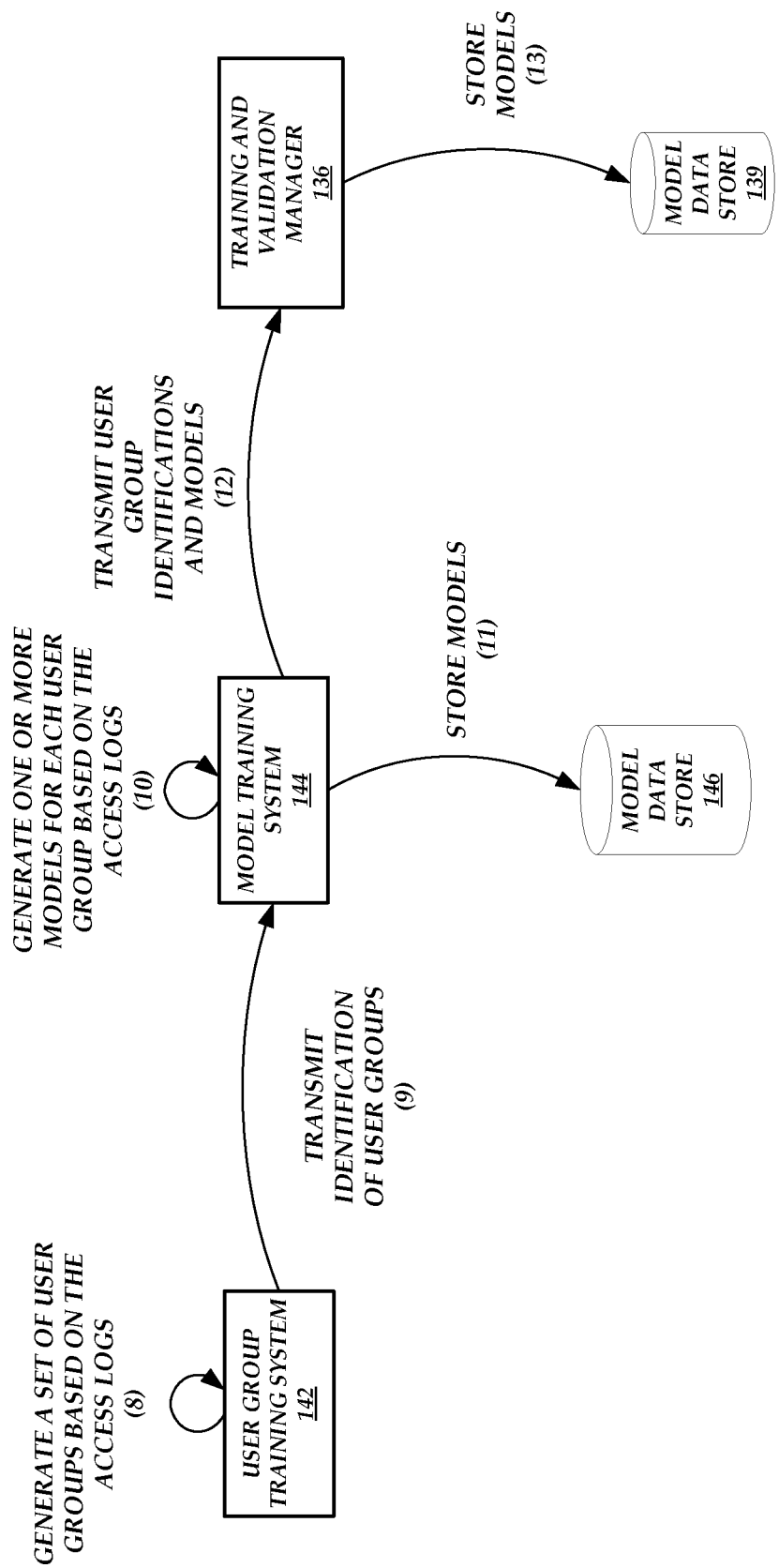

FIGS. 2A-2B are block diagrams of the operating environment 100 of FIG. 1 illustrating the operations performed by the components of the operating environment 100 to train artificial intelligence models for use in predicting data object(s) that a user device 102 may request in the future, according to one embodiment. As illustrated in FIG. 2A, the user device 102 transmits a content page request to the cache server 126 at (1). The content page request may include a request for one or more data objects.

The cache server 126 can transmit a request for data object(s) and user attributes to the origin server 104 at (2). For example, the requested data object(s) may be those data object(s) referenced or requested in the content page request received from the user device 102. The user attributes may be associated with the user device 102 that transmitted the content page request and/or the user operating the user device 102 and may be retrieved from a data store local or external to the POP 120 (not shown).

The origin server 104 can then generate a link header at (3) using an identification of the data object(s) requested and/or the user attributes. The link header may include user attributes and/or a reference to additional data object(s) for the cache server 126 to retrieve. The origin server 104 can then transmit the requested data object(s) and the link header to the cache server 126 at (4).

The cache server 126 can transmit the requested data object(s) to the user device 102 to satisfy the content page request. In addition, the cache server 126 can store the link header in the access logs data store 138 at (5).

At a later time, the training and validation manager 136 can retrieve access logs from the access logs data store 138 at (6). The access logs may include link headers stored by one or more cache servers 126, including the link header stored at (5). For example, an access log may include a link header (and therefore user attributes), a user device 102 that submitted a request causing the link header to be generated, data object(s) requested by the user device 102 that caused the link header to be generated, an identification of a content page requested by the user device 102, etc. The access logs, in the aggregate, may content pages requested by various user devices 102 and/or the order in which such content pages were requested. The training and validation manager 136 can then transmit the access logs to the predictive content push training system 140 at (7).

As illustrated in FIG. 2B, the user group training system 142 of the predictive content push training system 140 generates a set of groups (e.g., user groups) based on the access logs at (8). For example, the user group training system 142 can analyze the access logs to identify a set of user attributes that are common to users and/or user devices 102 that exhibit similar behavior. The set of user attributes that are common to users and/or user devices 102 that exhibit similar behavior may then define a group of users and/or user devices 102. The user group training system 142 can then transmit an identification of the user groups (e.g., definitions of the user groups) to the model training system 144 at (9).

The model training system 144 can generate one or more models (e.g., Markov models, neural networks, etc.) for each user group based on the access logs at (10). For example, the access logs may be training data, and the model training system 144 can train the models using the access logs. Once trained, the model training system 144 can optionally store the models in the model data store 146 at (11). In addition, the model training system 144 can transmit the user group identifications (e.g., the user group definitions) and the trained models to the training and validation manager 136 at (12). The training and validation manager 136 can then store the user group definitions and/or the models in the model data store 139 at (13) for later use.

While FIGS. 2A-2B depict operations performed by the components of the operating environment 100 in a specific order, this is merely exemplary and not meant to be limiting. Any one of the depicted operations can be performed in a different order. For example, in other embodiments not shown, operation (11) can be performed after operation (12). In addition, some or all of the operations depicted in FIGS. 2A-2B can be optional. For example, the model training system 144 may not store the models in the model data store 146 at (11). As another example, the training and validation manager 136 may not store the models in the model data store 139 at (13). Rather, the training and validation manager 136 could later retrieve models directly from the predictive content push training system 140.

Figure 3A:
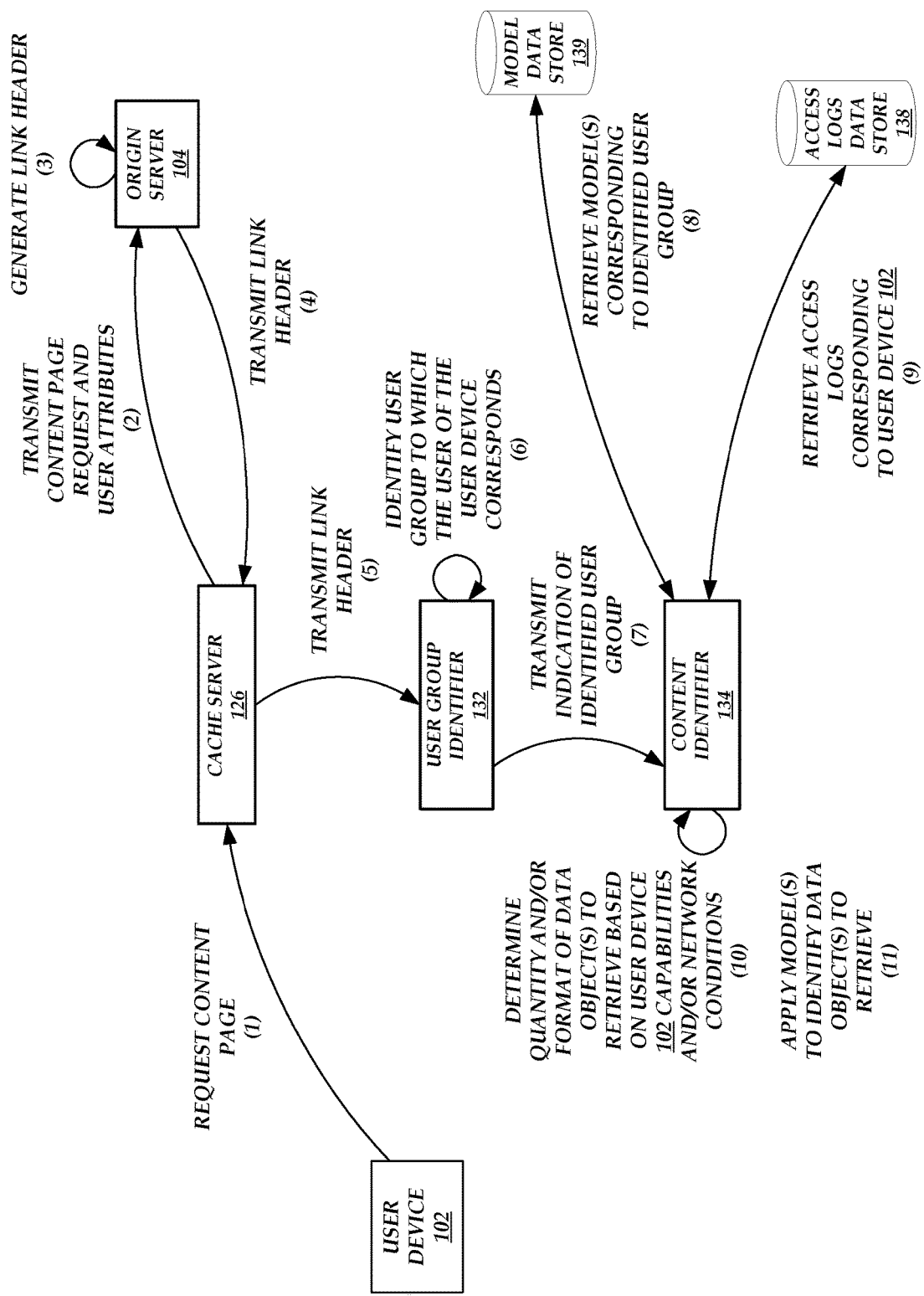
FIGS. 3A-3B are block diagrams of the operating environment of FIG. 1 illustrating the operations performed by the components of the operating environment to predict data object(s) that a user device may request in the future and proactively transmit such data object(s) to the user device before receiving a request for such data object(s), according to one embodiment.
Figure 3B:
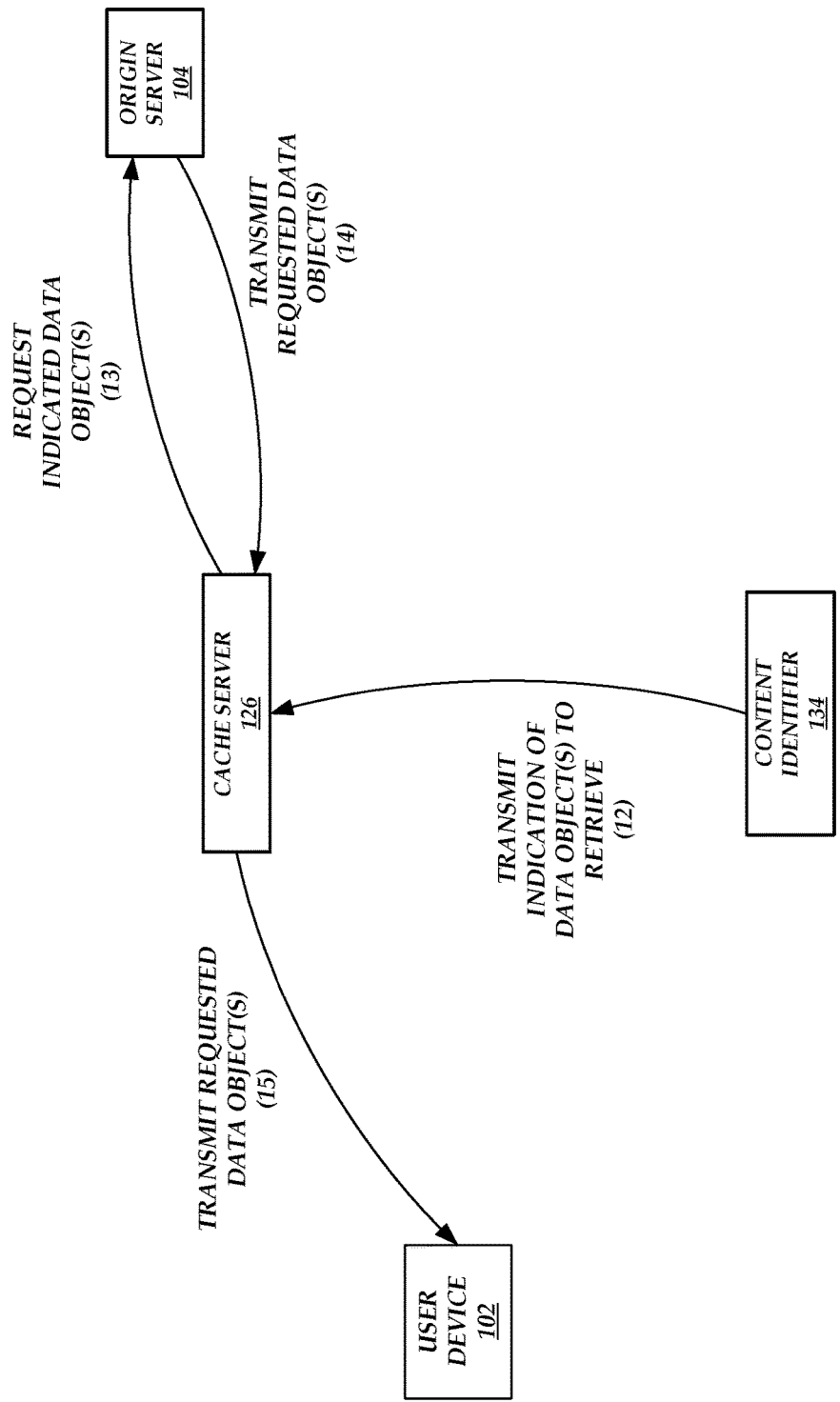

Example Block Diagrams for Predicting Content to Push Proactively to a User Device FIGS. 3A-3B are block diagrams of the operating environment 100 of FIG. 1 illustrating the operations performed by the components of the operating environment 100 to predict data object(s) that a user device 102 may request in the future and proactively transmit such data object(s) to the user device 102 before receiving a request for such data object(s), according to one embodiment. As illustrated in FIG. 3A, the user device 102 transmits a content page request to the cache server 126 at (1). The content page request may include a request for one or more data objects.

The cache server 126 can transmit a request for data object(s) and user attributes to the origin server 104 at (2). For example, the requested data object(s) may be those data object(s) referenced or requested in the content page request received from the user device 102. The user attributes may be associated with the user device 102 that transmitted the content page request and/or the user operating the user device 102 and may be retrieved from a data store local or external to the POP 120 (not shown).

The origin server 104 can then generate a link header at (3) using an identification of the data object(s) requested and/or the user attributes. The link header may include user attributes and/or a reference to additional data object(s) for the cache server 126 to retrieve. The origin server 104 can then transmit the requested data object(s) and the link header to the cache server 126 at (4).

The cache server 126 can transmit the requested data object(s) to the user device 102 to satisfy the content page request. In addition, the cache server 126 can transmit the link header to the user group identifier 132 at (5).

In some embodiments, any of operations (2) through (5) are optional. For example, the cache data store 128 may store data object(s) requested by the user device 102. As another example, use of the artificial intelligence models to predict data object(s) to retrieve and transmit to the user device 102 may render the generation and use of link headers unnecessary.

The user group identifier 132 can identify the user group to which the user device 102 and/or the user of the user device 102 belongs at (6). For example, the user group identifier 132 can compare the user attributes included in the link header to the various user group definitions to identify the user group to which the user device 102 and/or the user of the user device 102 belongs. Once identified, the user group identifier 132 can transmit an indication of the identified user group to the content identifier 134 at (7).

The content identifier 134 can retrieve one or more models corresponding to the identified user group from the model data store 139 at (8). In addition, the content identifier 134 can retrieve access logs corresponding to the user device 102 from the access logs data store 138 at (9). The access logs may indicate a current content page requested by the user device 102 and/or previous content pages requested by the user device 102 (and/or the order in which the content pages were requested). The content identifier 134 can use the content page request history to identify which of the retrieved model(s) to apply. For example, the content identifier 134 may apply those models that either correspond to a current content page (e.g., the content page requested by the user device 102 at operation (1)) or a sequence of content pages that matches a sequence of content pages requested by the user device 102. As an illustrative example, if the user device 102 requested content page A at operation (1), requested content page B prior to requesting content page A, and requested content page C prior to requesting content page B, then the content identifier 134 may apply models that either correspond to content page A or that correspond to the sequence of content pages C, B, and A (in that order).

The content identifier 134 can determine a quantity and/or format of data object(s) to retrieve based on the user device 102 capabilities and/or network conditions at (10). For example, the content identifier 134 can identify the user device 102 capabilities and/or the network conditions via a connection established between the POP 120 and the user device 102. The user device 102 capabilities and/or the network conditions may determine a data object quantity limit. In addition, the user device 102 capabilities and/or the network conditions may determine in which format the data object(s) should be transmitted. For example, the origin server 104 and/or the cache data store 128 may store multiple versions of the same data object, where each version has a different file size, image resolution, etc. Thus, high quality, medium quality, low quality, etc. versions of the same data object may be stored and/or retrieved. If the network conditions are poor and/or the user device 102 lacks certain features (e.g., multiple central processing units (CPUs), a stand-alone graphics card, high performance random access memory (RAM), a high speed network interface, etc.), then the content identifier 134 may determine that low quality versions of data object(s) should be retrieved and transmitted to the user device 102. Conversely, if the network conditions are strong and/or the user device 102 includes certain features (e.g., multiple central processing units (CPUs), a stand-alone graphics card, high performance random access memory (RAM), a high speed network interface, etc.), then the content identifier 134 may determine that high quality versions of data object(s) should be retrieved and transmitted to the user device 102.

The content identifier 134 can also apply some or all of the retrieved models (e.g., where the applied models are selected in a manner as described above) to identify data object(s) to retrieve at (11). While operation (11) is depicted after operation (10), this is not meant to be limiting. For example, not shown, the content identifier 134 can perform operation (11) before operation (10).

As illustrated in FIG. 3B, the content identifier 134 then transmits to the cache server 126 an indication of data object(s) to retrieve at (12) based on the performed operations (10) and (11). The cache server 126 then requested the indicated data object(s) from the origin server 104 at (13), and the origin server 104 transmits the requested data object(s) to the cache server 126 at (14). Alternatively, not shown, the requested data object(s) are stored in the cache data store 128 and thus the cache server 126 instead requests and receives the requested data object(s) from the cache data store 128. The cache server 126 then transmits the requested data object(s) to the user device 102 at (15) such that the user device 102 receives data object(s) proactively without requesting such data object(s). The user device 102 can then render and display the received data object(s) when a user provides an input to view a corresponding content page without having to first retrieve such data object(s) from an external system (e.g., the CDN service 122).

While FIGS. 3A-3B depict operations performed by the components of the operating environment 100 in a specific order, this is merely exemplary and not meant to be limiting. Any one of the depicted operations can be performed in a different order. For example, in other embodiments not shown, operation (10) can be performed after operation (11). In addition, some or all of the operations depicted in FIGS. 3A-3B can be optional. For example, the cache server 126 may not transmit a link header to the user group identifier 132 at (5).

Example Block Diagram for Validating the Artificial Intelligence Models

Figure 4:
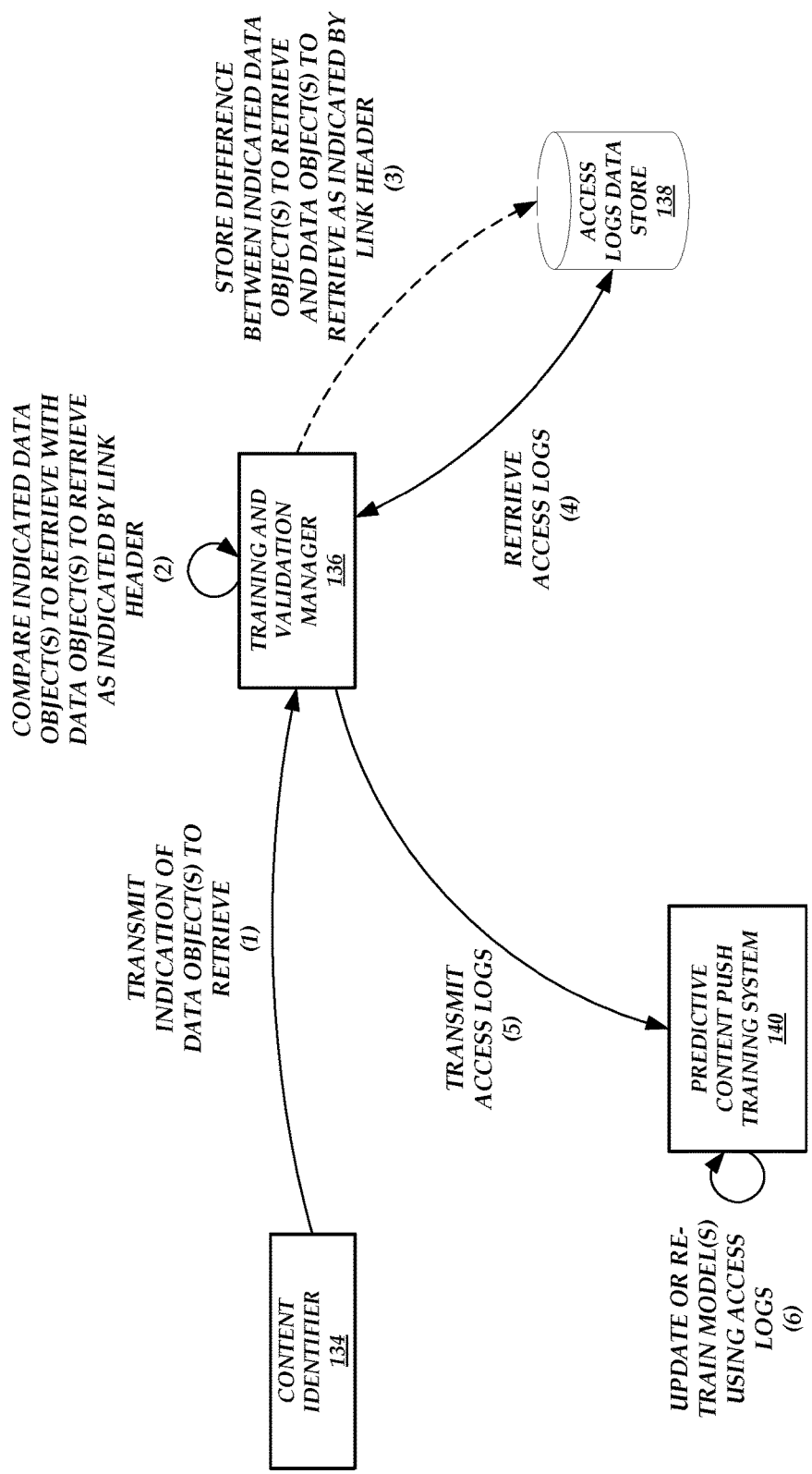
FIG. 4 is a block diagram of the operating environment of FIG. 1 illustrating the operations performed by the components of the operating environment to validate and update or re-train the artificial intelligence models, according to one embodiment.

FIG. 4 is a block diagram of the operating environment 100 of FIG. 1 illustrating the operations performed by the components of the operating environment 100 to validate and update or re-train the artificial intelligence models, according to one embodiment. As illustrated in FIG. 4, the content identifier 134 transmits to the training and validation manager 136 an indication of data object(s) to retrieve at (1). The content identifier 134 may transmit this indication after the operations described with respect to FIG. 3A are performed.

The training and validation manager 136 can compare the indicated data object(s) as received from the content identifier 134 with data object(s) to retrieve as indicated by a link header at (2). For example, the link header generated by the origin server 104 may indicate data object(s) predicted to be requested by the user device 102 in the future. Thus, the training and validation manager 136 can compare the indication received from the content identifier 134 with the contents of the link header to determine whether the models predicted the same data object(s) to retrieve as the link header. Optionally, if there is a difference between the indicated data object(s) to retrieve (as received from the content identifier 134) and the data object(s) to retrieve as indicated by the link header, then the training and validation manager 136 stores the difference or an indication of the difference in the access logs data store 138 at (3). Alternatively or in addition, not shown, the training and validation manager 136 stores the difference, an indication of a difference, and/or an indication of a lack of a difference in the access logs data store 138. In other embodiments, not shown, the training and validation manager 136 transmits the difference (or an indication of a difference or a lack of a difference) directly to the predictive content push training system 140.

At a later time, the training and validation manager 136 can retrieve access logs from the access logs data store 138 at (4). The access logs may include any differences between indicated data object(s) as received from the content identifier 134 and data object(s) to retrieve as indicated by the link header. The training and validation manager 136 then transmits the access logs to the predictive content push training system 140 at (5).

The predictive content push training system 140 can then update or re-train one or more models using the access logs at (6). Optionally, the predictive content push training system 140 also updates the definitions of one or more user groups using the access logs.

Example Markov Model for Predicting Data Object(s) to Transmit Proactively

Figure 5:
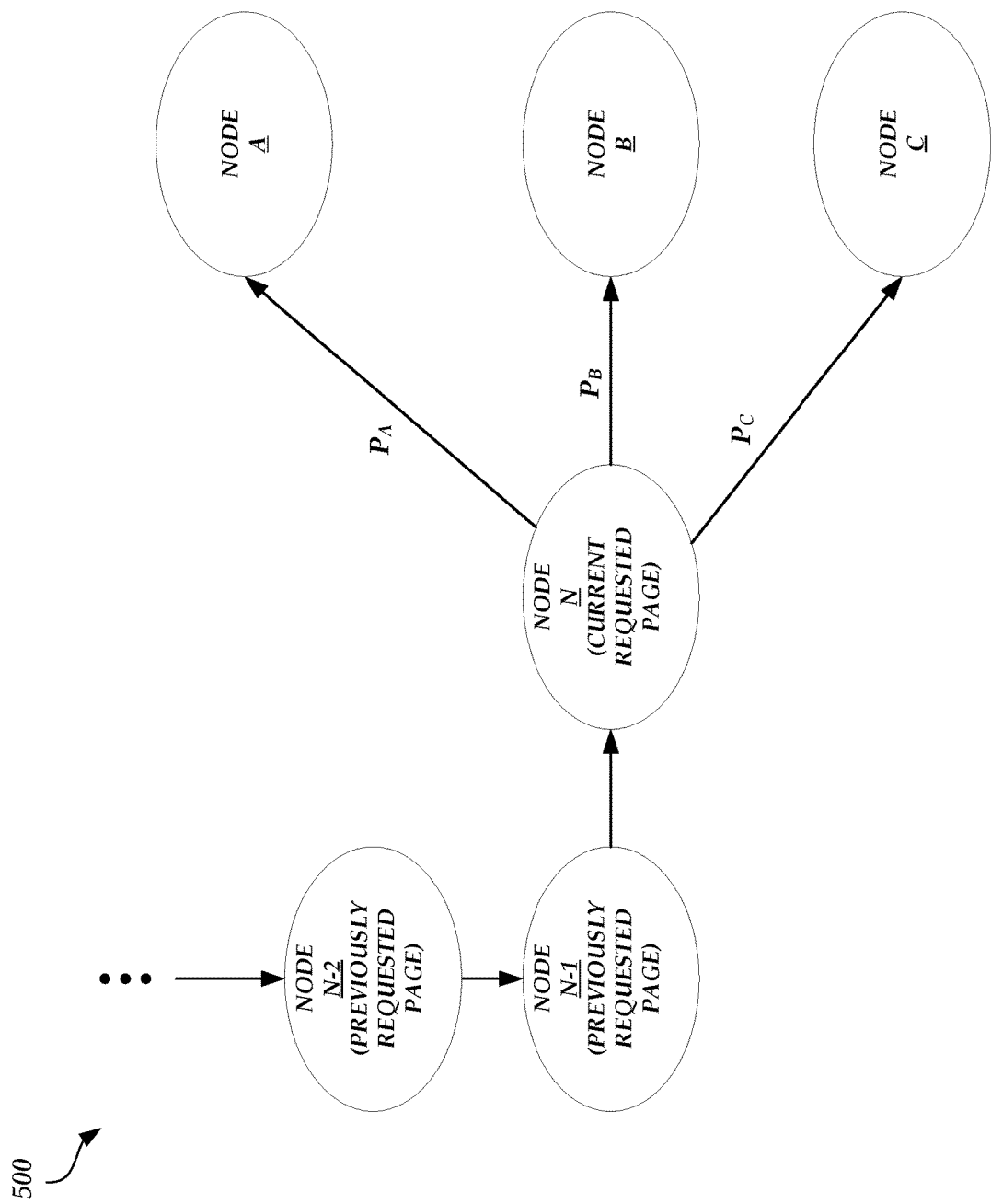
FIG. 5 is a block diagram of an example Markov model, according to one embodiment.

FIG. 5 is a block diagram of an example Markov model 500, according to one embodiment. As illustrated in FIG. 5, the Markov model 500 includes node N, node A, node B, and node C. The Markov model 500 further includes one or more nodes preceding node N in a Markov chain, such as node N−1, node N−2, etc.

The node N represents a current requested content page. For example, if the content identifier 134 is applying Markov model 500, node N would represent the most recent content page requested by the user device 102 (e.g., the content page that was requested that resulted in the content identifier 134 applying the Markov model 500). Node N−1 therefore represents a content page requested by the user device 102 immediately before the content page represented by node N. Similarly, node N−2 represents a content page requested by the user device 102 immediately before the content page represented by node N−1. Thus, the content identifier 134 may apply the Markov model 500 if a user device 102 submits a request for the content page represented by node N and previously submitted requests for the content pages represented by nodes N−1 and N−2 in the order depicted in FIG. 5 (e.g., node N−2 content page, then node N−1 content page, and then node N content page).

Nodes A, B, and C represent content pages that the user device 102 may request in the future. Node N is coupled to each of nodes A, B, and C via directional arcs that are each associated with a probability or transition probability. For example, the directional arc coupling node N to node A is associated with the probability $P_A$, the directional arc coupling node N to node B is associated with the probability $P_B$, and the directional arc coupling node N to node C is associated with the probability $P_C$. As an illustrative example, $P_A$ may be 0.35, $P_B$ may be 0.4, and $P_C$ may be 0.25. According to these probabilities, the predictive content push training system 140 trained the Markov model 500 such that the Markov model 500 predicts the next content page requested by the user device 102 is more likely to be node B than node A or node C. Accordingly, as described above, application of the Markov model 500 causes the content identifier 134 to retrieve some or all data objects associated with node B. If the data object quantity limit has not been exceeded, then the content identifier 134 can retrieve some or all data objects associated with node A (e.g., the node corresponding to the second highest probability). Again, if the data object quantity limit has not been exceeded, then the content identifier 134 can retrieve some or all data objects associated with node C (e.g., the node corresponding to the third highest probability). Otherwise, if the data object quantity limit is exceeded at any point, then the content identifier 134 can cease retrieving any further data objects.

The Markov model 500 can include any number of nodes (e.g., 0, 1, 2, 3, 4, 5, etc.) preceding the node N. Similarly, while not shown, the Markov model 500 may include any number of nodes following node N and/or any number of nodes following node A, node B, and/or node C. For example, a directional arc may extend from node A to a node D, with the arc being associated with a probability $P_D$. The content identifier 134 can use such Markov chains extending from node N in determining the quantity of data object(s) to retrieve and transmit to a user device 102. As an illustrative example, if a directional arc extends from node A to a node D, then the content identifier 134 can follow the following order of data object retrieval: (1) node B, node A, node C, node D; (2) node B, node A, node D (and any further nodes after node A or node D), node C; and/or the like.

The Markov model 500 may be associated with a single user or user device 102, a group of users or user devices 102, or all users and user devices 102. Furthermore, each node can represent a single content page or a plurality of content pages, as described above.

Example Predictive Content Push Routine

Figure 6:
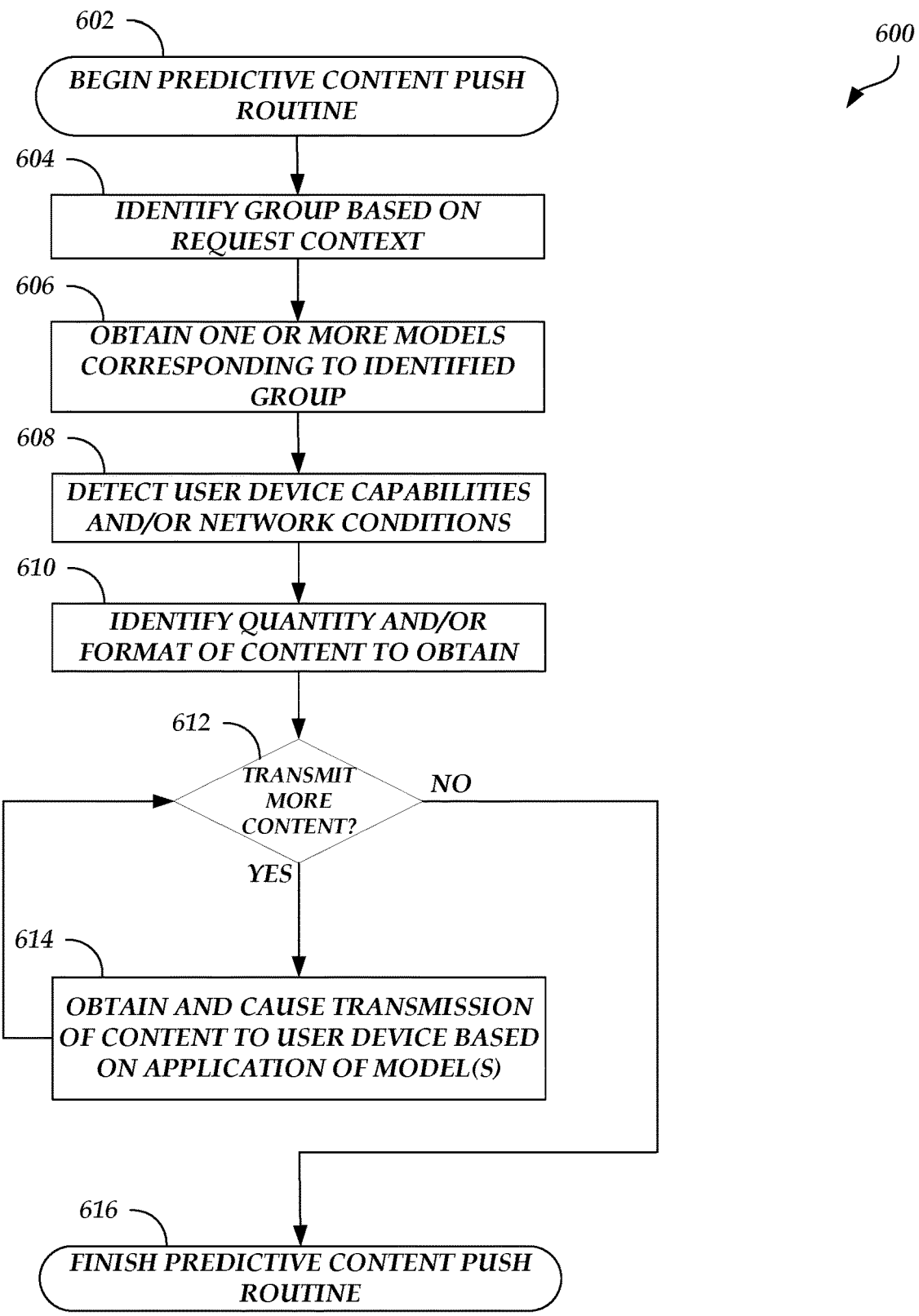
FIG. 6 is a flow diagram depicting a predictive content push routine illustratively implemented by a POP, according to one embodiment.

FIG. 6 is a flow diagram depicting a predictive content push routine 600 illustratively implemented by a POP, according to one embodiment. As an example, the POP 120 (e.g., the CDN service 122) of FIG. 1 can be configured to execute the predictive content push routine 600. The predictive content push routine 600 begins at block 602.

At block 604, a group is identified based on a request context. For example, the group can be identified based on user attributes of the user device and/or the user operating the user device and/or other contextual information, a requested content page, a transition from a previous content page to a current content page, etc.

At block 606, one or more models corresponding to the identified group are obtained. For example, the model(s) may correspond to a content page or a sequence of content pages.

At block 608, user device capabilities and/or network conditions are detected. For example, the user device capabilities and/or the network conditions can be detected via test messages transmitted over the connection between the user device and the POP.

At block 610, the quantity and/or format of content to obtain is identified. For example, the quantity and/or format may be identified based on the user device capabilities and/or the network conditions. As an illustrative example, content formatted to a resolution of 720p may be obtained if the user device has a display with a maximum resolution of 720p.

At block 612, a determination is made as to whether additional content should be transmitted to the user device. The determination may be made based on whether the data object quantity limit has been reached. For example, the data object quantity limit may not have been reached if no additional content has yet been transmitted to the user device. If the limit has been reached, then transmitting further content to the user device may congest the network and/or the user device. Thus, the predictive content push routine 600 proceeds to block 616 and ends. Otherwise, if the limit has not been reached, then transmitting further content to the user device may not congest the network and/or user device and may take advantage of the computing resources available (either in the user device or network). Thus, the predictive content push routine 600 proceeds to block 614.

At block 614, content is obtained and caused to be transmitted to the user device based on an application of one or more of the obtained models. For example, the obtained content may correspond to a content page represented by a node in a model that follows a node representing a current content page of the user device. The initial content obtained and caused to be transmitted may correspond to a node associated with a directional arc extending from the current content page node having the highest probability. If the predictive content push routine 600 repeats block 614 (after proceeding to block 614 from block 612 a second time), then the content obtained and caused to be transmitted may correspond to a node associated with a directional arc extending from the current content page node having the second highest probability. This pattern may continue until the predictive content push routine 600 no longer repeats block 614. The model that is applied may be a model that corresponds with a current content page of the user device or that corresponds with a sequence of content pages requested by the user device (where the sequence of content pages identified in the model are in the same order as the order in which the content pages are requested by the user device).

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of proactively transmitting content, the method comprising:
    as implemented by one or more computing devices configured with specific computer-executable instructions,
        obtaining, from a user device via a network, a request for a content page on a content delivery network (CDN) service, wherein the content page is associated with a first set of data objects, and wherein the CDN service is present on the one or more computing devices at a point of presence (POP);
        obtaining the first set of data objects;
        transmitting the first set of data objects to the user device;
        determining that a first group in a plurality of groups is associated with the request for the content page;
        detecting capabilities of the user device and conditions of the network;
        determining that the user device can process a first quantity of data objects and the network can transmit the first quantity of data objects using the capabilities of the user device and the conditions of the network;
        obtaining one or more Markov models corresponding to the first group;
        applying a first Markov model in the one or more Markov models, wherein the first Markov model corresponds to the requested content page;
        identifying a second set of data objects to obtain based on the application of the first Markov model, wherein the second set of data objects are associated with a second content page different than the requested content page, and wherein the user device has not yet requested the second content page after requesting the requested content page;
        determining that a quantity of the first set of data objects and the second set of data objects is less than the first quantity of data objects;
        obtaining the second set of data objects; and
        transmitting the second set of data objects to the user device.

2. The computer-implemented method of claim 1, wherein the first Markov model comprises at least a first node representing the requested content page, a second node coupled to the first node via a first arc that represents the second content page, and a third node coupled to the first node via a second arc that represents a third content page, and wherein a probability associated with the first arc is greater than a probability associated with the second arc.

3. The computer-implemented method of claim 2, further comprising:
    identifying a third set of data objects to obtain based on the application of the first Markov model, wherein the third set of data objects are associated with the third content page, and wherein the user device has not yet requested the third content page after requesting the requested content page;
    determining that a quantity of the first set of data objects, the second set of data objects, and the third set of data objects is less than the first quantity of data objects;
    obtaining the third set of data objects; and
    transmitting the third set of data objects to the user device.

4. The computer-implemented method of claim 2, wherein the first Markov model further comprises at least a fourth node preceding the first node that represents a fourth content page, and wherein the user device requested the fourth content page prior to requesting the requested content page.

5. The computer-implemented method of claim 1, wherein a second computing device external to the one or more computing devices trained the first Markov model using access logs collected by the CDN service corresponding to the user device and other user devices associated with the first group.

6. A system comprising:
    a first computing device comprising a first processor configured with first computer-executable instructions that, when executed by the first processor, cause the first computing device to train a first stochastic model; and
    a second computing device comprising a second processor in communication with the first computing device and configured with second computer-executable instructions that, when executed by the second processor, cause the second computing device to:
        obtain, from a user device via a network, a request for a content page, wherein the content page is associated with a first set of data objects;
        obtain the first set of data objects;
        cause transmission of the first set of data objects to the user device;
        determine that a first group in a plurality of groups is associated with the request for the content page;
        determine that the user device can process a first quantity of data objects based on detected capabilities of the user device;
        obtain the first stochastic model from the first computing device, wherein the first stochastic model corresponds to the first group;
        identify a second set of data objects to obtain using the first stochastic model, wherein the second set of data objects are associated with a second content page different than the requested content page, and wherein the user device has not yet requested the second content page after requesting the requested content page;
        determine that a quantity of the first set of data objects and the second set of data objects is less than the first quantity of data objects;
        obtain the second set of data objects; and
        cause transmission of the second set of data objects to the user device.

7. The system of claim 6, wherein the first stochastic model comprises a first Markov model, wherein the first Markov model comprises at least a first node representing the requested content page, a second node coupled to the first node via a first arc that represents the second content page, and a third node coupled to the first node via a second arc that represents a third content page, and wherein a probability associated with the first arc is greater than a probability associated with the second arc.

8. The system of claim 7, wherein the second computer-executable instructions further cause the second computing device to:
    identify a third set of data objects to obtain using the first Markov model, wherein the third set of data objects are associated with the third content page, and wherein the user device has not yet requested the third content page after requesting the requested content page;
    determine that a quantity of the first set of data objects, the second set of data objects, and the third set of data objects is less than the first quantity of data objects;
    obtain the third set of data objects; and
    cause transmission of the third set of data objects to the user device.

9. The system of claim 7, wherein the second computer-executable instructions further cause the second computing device to:
    identify a third set of data objects to obtain using the first Markov model, wherein the third set of data objects are associated with the third content page, and wherein the user device has not yet requested the third content page after requesting the requested content page;
    determine that a quantity of the first set of data objects, the second set of data objects, and the third set of data objects exceeds the first quantity of data objects; and
    determine not to obtain and cause transmission of the third set of data objects to the user device, thereby reducing a likelihood that at least one of the user device or the network becomes congested.

10. The system of claim 7, wherein the first Markov model further comprises at least a fourth node preceding the first node that represents a fourth content page, and wherein the user device requested the fourth content page prior to requesting the requested content page.

11. The system of claim 6, wherein the first computer-executable instructions further cause the first computing device to define the first group using access logs corresponding to the user device and other user devices that exhibited browsing behavior common with the user device.

12. The system of claim 6, wherein the second computer-executable instructions further cause the second computing device to:
    obtain a link header in response to transmission of a request for the first set of data objects, wherein the link header comprises a reference to a third set of data objects to obtain;
    compare the second set of data objects and the third set of data objects; and
    store any differences between the second set of data objects and the third set of data objects in access logs.

13. The system of claim 12, wherein the first computer-executable instructions further cause the first computing device to:
    re-train or update the first stochastic model using at least the differences; and
    cause transmission of the re-trained or updated first stochastic model to the second computing device for use when future content page requests are obtained.

14. The system of claim 6, wherein the second computer-executable instructions further cause the second computing device to:
- determine a first format of data objects to transmit to the user device using the capabilities of the user device;
- obtain a version of the first set of data objects in the first format and a version of the second set of data objects in the first format; and
- cause transmission of the version of the first set of data objects in the first format and the version of the second set of data objects in the first format to the user device.

15. Non-transitory, computer-readable storage media comprising computer-executable instructions, wherein the computer-executable instructions, when executed by a computer system, cause the computer system to:
- obtain, from a user device via a network, a request for a content page, wherein the content page is associated with a first set of data objects;
- obtain the first set of data objects;
- cause transmission of the first set of data objects to the user device;
- determine that a first group in a plurality of groups is associated with the request for the content page;
- obtain a first artificial intelligence model, wherein the first artificial intelligence model corresponds to the first group;
- identify a second set of data objects to obtain using the first artificial intelligence model, wherein the second set of data objects are associated with a second content page different than the requested content page, and wherein the user device has not yet requested the second content page after requesting the requested content page;
- obtain the second set of data objects; and
- cause transmission of the second set of data objects to the user device in response to a determination that a quantity of the first set of data objects and the second set of data objects can be processed by the user device.

16. The non-transitory, computer-readable storage media of claim 15, wherein the first artificial intelligence model comprises at least one of a first Markov model or a neural network.

17. The non-transitory, computer-readable storage media of claim 15, wherein the first Markov model comprises at least a first node representing the requested content page, a second node coupled to the first node via a first arc that represents the second content page, and a third node coupled to the first node via a second arc that represents a third content page, and wherein a probability associated with the first arc is greater than a probability associated with the second arc.

18. The non-transitory, computer-readable storage media of claim 15, wherein the computer-executable instructions further cause the computer system to:
- identify a third set of data objects to obtain using the first Markov model, wherein the third set of data objects are associated with a third content page, and wherein the user device has not yet requested the third content page after requesting the requested content page;
- determine that transmission of the first set of data objects, the second set of data objects, and the third set of data objects to the user device will not cause an available bandwidth of the network as a percentage of a total bandwidth of the network to drop below a threshold value;
- obtain the third set of data objects; and
- cause transmission of the third set of data objects to the user device.

19. The non-transitory, computer-readable storage media of claim 15, wherein the first Markov model further comprises at least a fourth node preceding the first node that represents a fourth content page, and wherein the user device requested the fourth content page prior to requesting the requested content page.

20. The non-transitory, computer-readable storage media of claim 15, wherein the computer-executable instructions further cause the computer system to:
- obtain a link header in response to transmission of a request for the first set of data objects, wherein the link header comprises a reference to a third set of data objects to obtain;
- compare the second set of data objects and the third set of data objects; and
- store any differences between the second set of data objects and the third set of data objects in access logs such that the first artificial intelligence model can be re-trained or updated using at least the differences to improve predictions when future content page requests are obtained.

* * * * *